US011347908B2

(12) United States Patent
Matusik et al.

(10) Patent No.: US 11,347,908 B2
(45) Date of Patent: May 31, 2022

(54) INTELLIGENT ADDITIVE MANUFACTURING

(71) Applicant: Inkbit, LLC, Medford, MA (US)

(72) Inventors: Wojciech Matusik, Lexington, MA (US); Desai Chen, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/014,344

(22) Filed: Sep. 8, 2020

(65) Prior Publication Data

US 2021/0124857 A1    Apr. 29, 2021

Related U.S. Application Data

(63) Continuation of application No. 16/672,711, filed on Nov. 4, 2019, now Pat. No. 10,769,324.

(60) Provisional application No. 62/754,770, filed on Nov. 2, 2018.

(51) Int. Cl.
*G06F 30/20* (2020.01)
*B29C 64/393* (2017.01)
*G06N 20/00* (2019.01)
*G06N 3/08* (2006.01)
(Continued)

(52) U.S. Cl.
CPC ............ *G06F 30/20* (2020.01); *B29C 64/393* (2017.08); *G06N 3/08* (2013.01); *G06N 20/00* (2019.01); *B33Y 50/02* (2014.12); *G06F 2119/18* (2020.01)

(58) Field of Classification Search
CPC .... G06F 3/1236; G06F 3/1203; G06F 3/1229; G06F 3/1285; G06F 30/20; G06F 2119/18; H04N 2201/0094; B29C 64/393; B29C 64/209; B33Y 70/00; B33Y 10/00;
(Continued)

(56) References Cited

U.S. PATENT DOCUMENTS

| 5,460,758 A | 10/1995 | Langer et al. |
| 6,492,651 B2 | 12/2002 | Kerekes |
| 8,237,788 B2 | 8/2012 | Cooper et al. |

(Continued)

FOREIGN PATENT DOCUMENTS

| EP | 2186625 B1 | 12/2016 |
| EP | 3459716 A1 | 3/2019 |

(Continued)

OTHER PUBLICATIONS

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

(Continued)

*Primary Examiner* — Kidest Bahta
(74) *Attorney, Agent, or Firm* — Occhiuti & Rohlicek LLP

(57) ABSTRACT

An approach to intelligent additive manufacturing makes use of one or more of machine learning, feedback using machine vision, and determination of machine state. In some examples, a machine learning transformation receives data representing a partially fabricated object and a model of an additional part (e.g., layer) of the part, and produces a modified model that is provided to a printer. The machine learning predistorter can compensate for imperfections in the partially fabricated object as well as non-ideal characteristics of the printer, thereby achieving high accuracy.

18 Claims, 26 Drawing Sheets

(51) Int. Cl.
  *B33Y 50/02* (2015.01)
  *G06F 119/18* (2020.01)
(58) Field of Classification Search
  CPC ........ B33Y 50/02; C09D 11/101; G06N 3/08; G06N 20/00
  See application file for complete search history.

(56) References Cited

U.S. PATENT DOCUMENTS

| | | | |
|---|---|---|---|
| 9,259,931 B2 | 2/2016 | Moreau et al. | |
| 9,562,759 B2 | 2/2017 | Vogler et al. | |
| 9,697,604 B2 | 7/2017 | Wang et al. | |
| 9,952,506 B2 | 4/2018 | Arai et al. | |
| 10,011,071 B2 | 7/2018 | Batchelder | |
| 10,252,466 B2 | 4/2019 | Ramos et al. | |
| 10,456,984 B2 | 10/2019 | Matusik et al. | |
| 10,725,446 B2 | 7/2020 | Mercelis | |
| 2002/0104973 A1 | 8/2002 | Kerekes | |
| 2004/0085416 A1 | 5/2004 | Kent | |
| 2004/0114002 A1 | 6/2004 | Kosugi et al. | |
| 2004/0173946 A1 | 9/2004 | Pfeifer et al. | |
| 2006/0007254 A1 | 1/2006 | Tanno et al. | |
| 2007/0106172 A1 | 5/2007 | Abreu | |
| 2007/0241482 A1 | 10/2007 | Giller et al. | |
| 2008/0124475 A1 | 5/2008 | Kritchman | |
| 2009/0073407 A1 | 3/2009 | Okita | |
| 2009/0105605 A1 | 4/2009 | Abreu | |
| 2009/0220895 A1 | 9/2009 | Garza et al. | |
| 2009/0279089 A1 | 11/2009 | Wang | |
| 2009/0279098 A1 | 11/2009 | Ohbayashi et al. | |
| 2010/0140550 A1 | 6/2010 | Keller et al. | |
| 2010/0158332 A1 | 6/2010 | Rico et al. | |
| 2012/0275148 A1 | 11/2012 | Yeh et al. | |
| 2013/0182260 A1 | 7/2013 | Bonnema et al. | |
| 2013/0328227 A1 | 12/2013 | McKinnon et al. | |
| 2014/0249663 A1 | 9/2014 | Voillaume | |
| 2014/0300676 A1 | 10/2014 | Miller et al. | |
| 2014/0328963 A1 | 11/2014 | Mark et al. | |
| 2015/0061178 A1 | 3/2015 | Siniscalchi et al. | |
| 2015/0101134 A1 | 4/2015 | Manz et al. | |
| 2015/0124019 A1 | 5/2015 | Cruz-Uribe et al. | |
| 2015/0352792 A1 | 12/2015 | Kanada | |
| 2016/0018404 A1 | 1/2016 | Iyer et al. | |
| 2016/0023403 A1 | 1/2016 | Ramos et al. | |
| 2016/0101568 A1 | 4/2016 | Mizes et al. | |
| 2016/0157751 A1 | 6/2016 | Mahfouz | |
| 2016/0167301 A1 | 6/2016 | Cole et al. | |
| 2016/0185044 A1* | 6/2016 | Leonard | G05B 15/02 700/98 |
| 2016/0209319 A1 | 7/2016 | Adalsteinsson et al. | |
| 2016/0249836 A1 | 9/2016 | Gulati et al. | |
| 2016/0320771 A1 | 11/2016 | Huang | |
| 2016/0347005 A1 | 12/2016 | Miller | |
| 2017/0021455 A1 | 1/2017 | Dallarosa et al. | |
| 2017/0078524 A1* | 3/2017 | Tajima | H04N 1/32797 |
| 2017/0087766 A1 | 3/2017 | Chung et al. | |
| 2017/0106604 A1 | 4/2017 | Dikovsky et al. | |
| 2017/0120337 A1 | 5/2017 | Kanko et al. | |
| 2017/0143494 A1 | 5/2017 | Mahfouz | |
| 2017/0217103 A1 | 8/2017 | Babaei et al. | |
| 2017/0235293 A1 | 8/2017 | Shapiro et al. | |
| 2017/0355147 A1 | 12/2017 | Buller et al. | |
| 2018/0017501 A1 | 1/2018 | Trenholm et al. | |
| 2018/0036964 A1 | 2/2018 | DehghanNiri et al. | |
| 2018/0056288 A1 | 3/2018 | Abate et al. | |
| 2018/0056582 A1 | 3/2018 | Matusik et al. | |
| 2018/0071984 A1 | 3/2018 | Lee et al. | |
| 2018/0095450 A1* | 4/2018 | Lappas | B33Y 10/00 |
| 2018/0099333 A1 | 4/2018 | DehghanNiri et al. | |
| 2018/0143147 A1 | 5/2018 | Milner et al. | |
| 2018/0154580 A1 | 6/2018 | Mark | |
| 2018/0169953 A1 | 6/2018 | Matusik et al. | |
| 2018/0194066 A1 | 7/2018 | Ramos et al. | |
| 2018/0273657 A1 | 9/2018 | Wang et al. | |
| 2018/0281067 A1 | 10/2018 | Small et al. | |
| 2018/0297113 A1 | 10/2018 | Preston et al. | |
| 2018/0304549 A1 | 10/2018 | Safai et al. | |
| 2018/0311893 A1 | 11/2018 | Choi et al. | |
| 2018/0320006 A1 | 11/2018 | Lee et al. | |
| 2018/0341248 A1 | 11/2018 | Mehr et al. | |
| 2018/0348492 A1 | 12/2018 | Pavlov et al. | |
| 2019/0056717 A1 | 2/2019 | Kothari et al. | |
| 2019/0077921 A1 | 3/2019 | Eckel | |
| 2019/0118300 A1 | 4/2019 | Penny et al. | |
| 2019/0270254 A1 | 9/2019 | Mark et al. | |
| 2019/0271966 A1 | 9/2019 | Coffman et al. | |
| 2019/0322031 A1 | 10/2019 | Kritchman | |
| 2019/0329322 A1 | 10/2019 | Preston et al. | |
| 2019/0346830 A1 | 11/2019 | de Souza Borges Ferreira et al. | |
| 2019/0353767 A1 | 11/2019 | Eberspach et al. | |
| 2020/0004225 A1 | 1/2020 | Buller et al. | |
| 2020/0122388 A1 | 4/2020 | Van Esbroeck et al. | |
| 2020/0143006 A1 | 5/2020 | Matusik et al. | |
| 2020/0147888 A1 | 5/2020 | Ramos et al. | |
| 2020/0215761 A1 | 7/2020 | Chen et al. | |
| 2020/0223143 A1 | 7/2020 | Gurdiel Gonzalez et al. | |

FOREIGN PATENT DOCUMENTS

| | | |
|---|---|---|
| EP | 3527352 A1 | 8/2019 |
| JP | 2014098555 A | 5/2014 |
| JP | 6220476 B1 | 10/2017 |
| JP | 2018103488 A | 7/2018 |
| KR | 101567281 B1 | 11/2015 |
| KR | 20180067961 A | 6/2018 |
| WO | 98/45141 A2 | 10/1998 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |
| WO | 2020/146490 A1 | 7/2020 |
| WO | 2020145982 A1 | 7/2020 |

OTHER PUBLICATIONS

Blanken, Lennart "Learning and repetitive control for complex systems: with application to large format printers." (2019).
Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.
Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.
Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.
Klein, Thomas, and Robert Huber. "High-speed OCT light sources and systems." Biomedical optics express 8, No. 2 (2017): 828-859.
Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.
Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.
Moon, Sucbei, and Dug Young Kim. "Ultra-high-speed optical coherence tomography with a stretched pulse supercontinuum source." Optics Express 14, No. 24 (2006): 11575-11584.
Zhou, Chao, Aneesh Alex, Janarthanan Rasakanthan, and Yutao Ma. "Space-division multiplexing optical coherence tomography." Optics express 21, No. 16 (2013): 19219-19227.

(56) References Cited

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

Fischer, Björn, Christian Wolf, and Thomas Hartling. "Large field optical tomography system." In Smart Sensor Phenomena, Technology, Networks, and Systems Integration 2013, vol. 8693, p. 86930P. International Society for Optics and Photonics, 2013.

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Kulik, Eduard A., and Patrick Calahan. "Laser profilometry of polymeric materials." Cells and Materials 7, No. 2 (1997): 3.

Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).

DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

Yu C, Jiang J. A Perspective on Using Machine Learning in 3D Bioprinting. Int J Bioprint. Jan. 24, 2020;6(1):253. doi: 10.18063/ijb.v6i1.253.

Goh, G.D., Sing, S.L. & Yeong, W.Y. A review on machine learning in 3D printing: applications, potential, and challenges. Artif Intell Rev 54, 63-94 (2021). https://doi.org/10.1007/s10462-020-09876-9.

Optimal shape morphing control of 4D printed shape memory polymer based on reinforcement learning Robotics and Computer-Integrated Manufacturing (IF5.666), Pub Date : Jul. 17, 2021, DOI: 10.1016/j.rcim.2021.102209.

Zhao, Xiaozhou, Julia A. Bennell, Tolga Bekta?, and Kath Dowsland. "A comparative review of 3D container loading algorithms." International Transactions in Operational Research 23, No. 1-2 (2016): 287-320.

* cited by examiner

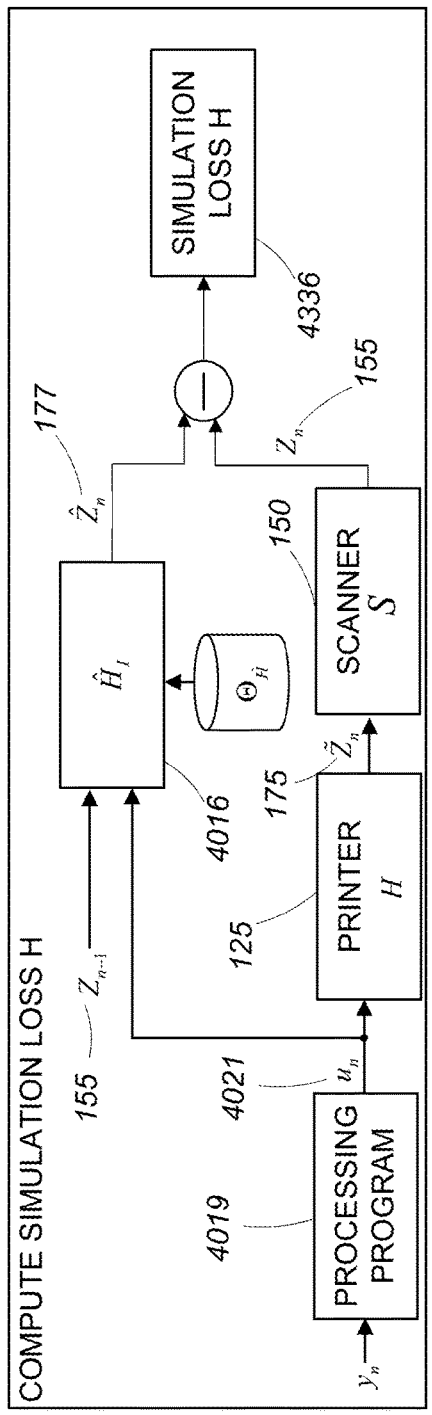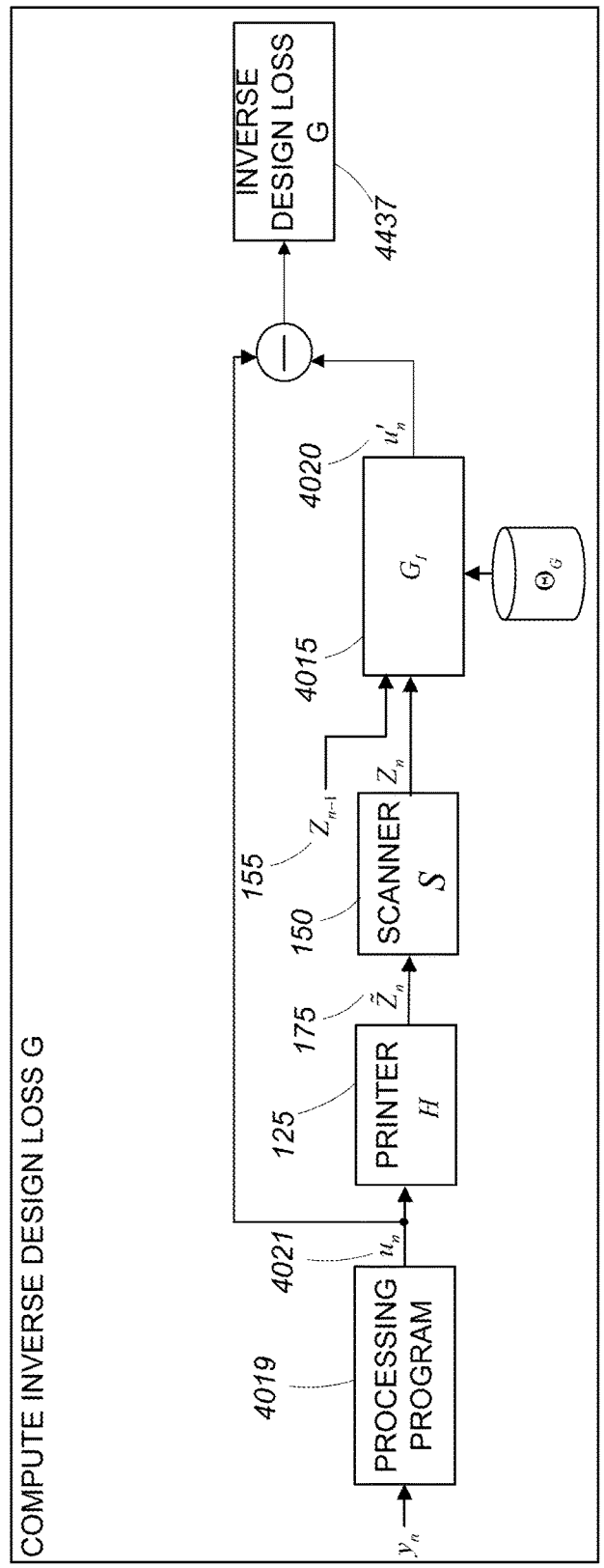
FIG. 43
FIG. 44

INTELLIGENT ADDITIVE MANUFACTURING

CROSS-REFERENCE TO RELATED APPLICATIONS

This application is a Continuation of application Ser. No. 16/672,711 filed on Nov. 4, 2019, which claims the benefit of U.S. Provisional Application No. 62/754,770, filed on Nov. 2, 2018. The contents of the aforementioned applications are hereby incorporated by reference in their entirety.

BACKGROUND

This invention relates to an intelligent additive manufacturing approach, and more particularly an approach that makes use of one or more of machine learning, feedback using machine vision, and determination of machine state.

Additive manufacturing (AM) is a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition modeling® (FDM®), light polymerization processes, such as stereolithography (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limits the efficiency and quality that results.

Inkjet 3D printing is a method of additive manufacturing where printheads deposit droplets of liquid ink. Printheads are typically mounted on a gantry system to allow deposition of ink in different locations within the build volume. The build platform may also move with respect to the printheads, which may be stationary. The liquid ink is solidified using UV or visible-light radiation.

Multiple printheads may be used in one system in order to build objects with multiple base materials. For example, materials that have different optical, mechanical, thermal, electromagnetic properties can be used. These materials can be combined to achieve composite materials with a wide range of material properties.

The UV curing unit is typically one of the subsystems used within an inkjet additive manufacturing apparatus. UV radiation provides the means of solidifying inks via photo-initiation of the polymerization reaction. UV radiation can be supplied by a variety of different mechanisms such as arrays of LEDs and Mercury or Xenon arc lamps. UV curing is typically applied after each layer is printed or after each material within a layer is deposited. The UV curing unit can be fixed with respect to the printer or it can move independently with respect to the object.

Alternatively, ink solidification can be achieved by changes in thermal conditions. For example, a liquid material solidifies as its temperature is lowered. A variety of different inks can be used in this category such as waxes. Both UV-phase change inks and thermal-phase change inks can be combined to manufacture an object.

Because of the slight variation of each drop and surface tension of inks, liquid layers deposited onto the platform are not perfectly flat, requiring a mechanical flattening device in order to eliminate the error and error accumulation caused by uneven layers. The flattening device may be a roller, script, or even mill, etc. Typically, about 20-30% of jetted material is removed during the flattening process, resulting in significant waste and increased material cost.

3D printed objects when manufactured using an inkjet process may need structural support. For example, most objects with overhangs need support structures. Typically, additional print data is generated for these support structures. In inkjet additive manufacturing, typically a separate ink is designated as a support material. This ink is deposited also using printheads and then it is solidified. It is desirable for the support material to be easily removed after the print is completed. There are many potential support materials including UV-curable materials that are soluble in water or other solvents or wax-based materials that can be removed by melting.

After the printing process is completed, parts are typically post-processed. For example, support material may need to be removed. The parts might also need to be post-processed to improve their mechanical or thermal properties. This may include thermal treatment and/or additional UV exposure.

Inks suitable for inkjet printing need to conform to certain specifications. The key requirements include: 1) viscosity typically needs to be within 3-15 cps at the operating conditions; 2) surface tension typically should be between 20-45 mN/m; 3) thermal stability—the ink should not solidify within the printhead, ink container, or feeding system; 4) formulation stability—different components of the ink should not separate for a reasonably long time. Inks are typically optimized in order to meet the specifications for printing.

Furthermore, the waveform for driving the printheads must be optimized and adapted for each ink. Moreover, many different parameters of the printing process need to be adapted for individual inks, such as printhead and ink pre-heating.

In many cases inks may include additives. These additives include colorants in the form of dyes or pigments or the mixture of pigments and dyes that are dispersed or dissolved in the ink. Surfactants may also be used to adjust the surface tension of the ink for improved jetting or printing performance. In addition, other types of particles or additives may be used in order to enhance the mechanical, thermal or optical characteristics of the cured resin.

SUMMARY

In one aspect, in general, a method for fabricating a 3D object via a printer includes receiving a 3D specification of a part of the 3D object. A predistorter processes the 3D specification to produce a modified 3D specification of the part of the object. The predistorter is configured with configuration data to compensate for at least some characteristics of a printing process. The printer prints or is caused to print the first part of the object according to the printing process based at least in part on the modified 3D specification.

In some examples, a printing system that incorporates the printer is configured by receiving training data comprising a plurality to training tuples. Each training tuple includes a specification, and a scan representing fabrication of the specification using the printer of the printing system. The training data is processed to produce configuration data, which is then used to configure a predistorter for use in printing by the printing system.

In another aspect, in general, a method for fabricating a 3D object via a printer includes receiving a 3D specification of a part of the 3D object. A predistorter processes the 3D specification to produce a modified 3D specification of the part of the object. The predistorter includes a series of configurable predistorters. The configurations of the predistorters are represented in the configuration data. The configuration data is used to compensate for at least some characteristics of a printing process. The printer prints or is caused to print the first part of the object according to the printing process based at least in part on the modified 3D specification.

In another aspect, in general, a method for fabricating a 3D object via a printer includes receiving a 3D specification. The 3D specification is representative of a part of the 3D object as well as an additional part of the 3D object to be fabricated on a previously fabricated part of the 3D object. A predistorter processes the 3D specification to produce a modified 3D specification of the part of the object. The predistorter is configured with configuration data to compensate for at least some characteristics of a printing process. The printer prints or is caused to print the first part of the object according to the printing process based at least in part on the modified 3D specification.

In another aspect, in general, a method for configuring a predistorter to be used in fabricating a 3D object via a printer is described. The method includes estimating a first set of values representing a printing process. The printing process is configured to receive a specification of a 3D object and cause the object to be fabricated. A second set of values is then estimated. The second set of values represents a preprocess for the printing process. The preprocess is configurable to accept the specification of a 3D object and produce a modified specification of said object. The estimating of the first set of values and the second set of values includes optimizing a loss function that depends at least in part on a combined characteristic of the preprocess and the printing process. In some examples, the combined characteristic of the preprocess and the printing process including a characteristic of a sequential application of the preprocess and the printing process (e.g., a "loop" loss function).

Aspect may include one or more of the following features.

Using the predistorter includes using a series of configurable predistorters. The configurations of these configurable predistorters is represented in the configuration data (225).

The configurable predistorters belong to a set of available predistorters, and the configuration data (225) further represents a selection and/or ordering of the predistorters in the series of predistorters.

At least some of the configurable predistorters are resolution-independent predistorters.

The 3D specification represents the entire 3D object to be fabricated.

The 3D specification represents an additional part of the 3D object to be fabricated on a previously fabricated part of the 3D object.

A scanner is used to produce scan data representative of the previously fabricated part.

The scan data comprises a depth map for the previously fabricated part.

The scan data comprises three-dimensional representation of a plurality of volume elements of the previously fabricated part, including material identifiers associated with said volume elements.

Using the predistorter further comprises using the scan data representative of the previously fabricated part to produce the modified 3D specification.

The previously fabricated part comprises a surface on which the additional part is to be fabricated, and the scan data represents said surface.

Using the predistorter comprises applying an artificial neural network.

The configuration data are updated after causing the printer to print the first part. This updating includes receiving scan data representing the object after printing of the first part according to the modified 3D specification; processing data including the modified 3D specification and the received scan data to update the configuration data; processing a specification of a second part of the object to produce a modified 3D specification of the second part according to the updated configuration parameters; and causing the print to print the second part of the object.

Advantages of one or more embodiments may include increased accuracy in fabrication of objects from specifications of those objects. Embodiments that use machine learning may learn complex predistorters that more accurately characterize non-ideal aspects of a 3D printer. Embodiments that use a series of configurable resolution-independent predistorters may provide accurate compensation for non-ideal characteristics of a printer without requiring excessive numbers of parameters, and therefore without requiring excessive amounts of training data.

Other features and advantages of the invention are apparent from the following description, and from the claims.

DESCRIPTION OF DRAWINGS

FIG. 43 is a simulation loss computation module.

FIG. 44 is an inverse design loss computation module.

DESCRIPTION

Overview

Figure 1:
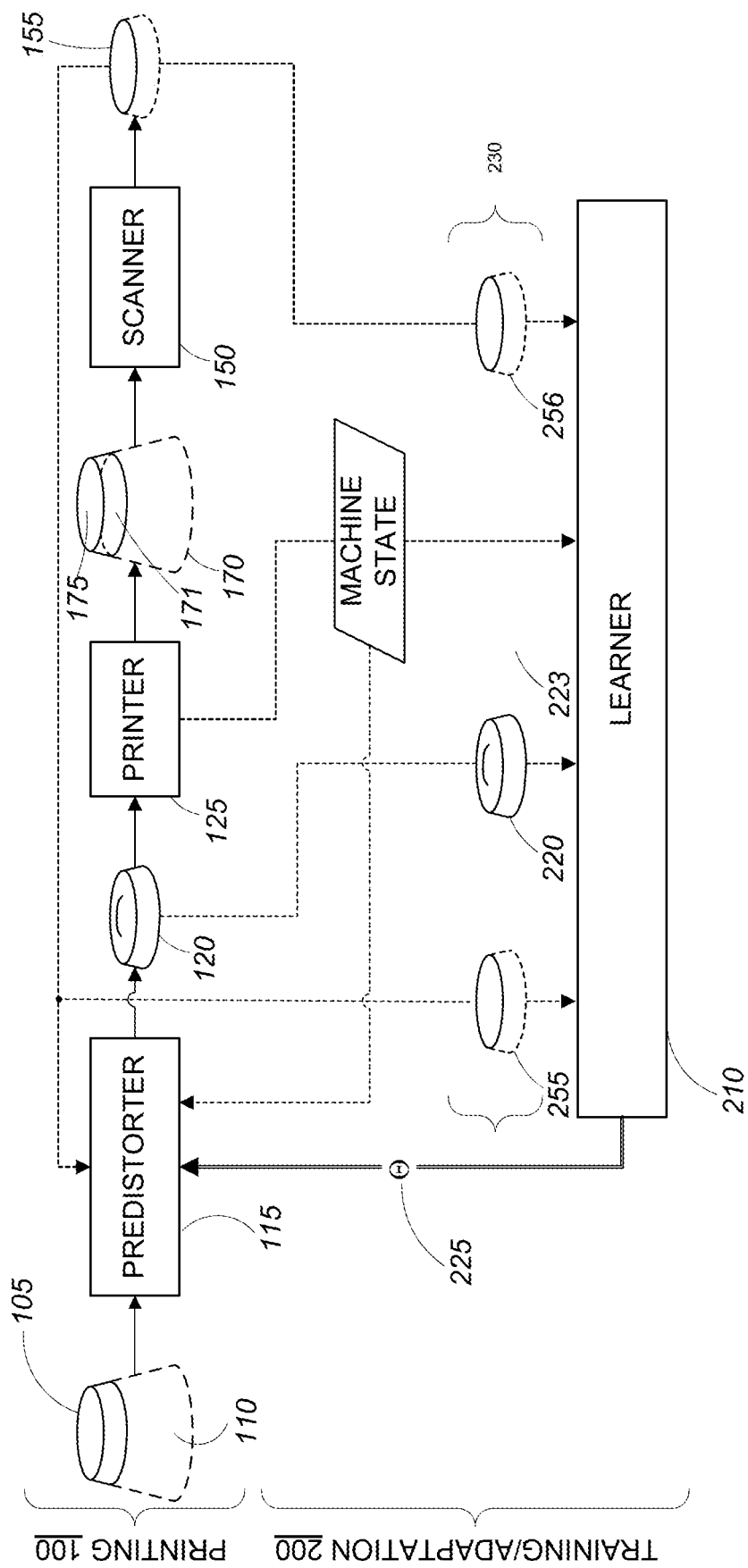
FIG. 1 is a schematic block diagram of a printing and associated training/adaptation system for 3D additive manufacturing.

Referring to FIG. 1, a printing system 100 accepts a specification 105 of some or all of an object to be fabricated. In the figure, this specification 105 represents a first part of an object that is to be fabricated on a second part, with a specification 110, that has already been fabricated. However, it should be understood that it is not essential for the approach described in this application to be applied to incremental parts being added to form an object, and the approach may be applied to a specification of an entire part. Furthermore, the term "specification" should be understood broadly, and to have many alterative forms. In general, the specification 105 specifies a desired 3D structure (e.g., a solid model), and may be represented, for instance without limitation: as a surface (e.g., in micropolygon form, such as an STL file, or analytically as a functional form of the surface); as a set of quantized volume regions (e.g., "voxels") indicating which regions are to be filled, the material(s) to use, the density; as a thickness (e.g., in a z dimension) of a thin planar slab as a function of location on the plane (e.g., the x-y plane) of the slab; or as a desired resulting top surface after adding the part to the object. In some implementations, the specification 105 is a product of a planning (e.g., a "slicing") phase (not shown in FIG. 1) that processes a specification of an entire object and forms specifications of layers to be fabricated in turn to form the entire object.

Continuing to refer to FIG. 1, the printing system 100 is characterized by a parameterized predistorer 115, which takes as input the specification 105 and produces a modified specification 120 (or other suitable input to the printer 125, such as printer commands or some sort of printing plan). The terms "predistorter" or "distort" do not connote particular types of operations, and should not be viewed as limiting (i.e., operations other than geometric modification are encompassed). In some or all embodiments, the predistorter is configured to essentially form an inverse (a "pre-inverse") of a printing process, such that when the modified specification 120 is provided to a printer 125 and fabricated to form a corresponding fabricated part 175 of the object, that part 175 matches the originally desired specification 105 that is provided as input. In this document the "predistrorter" may be equivalently be referred to as a "predistorter," "prepro-cessor," "compensator" or the like. Therefore, the predistorter functions as part of feedforward (or feedback) control system. As discussed further below, the predistorter is configured with parameters Θ 225, which are determined by a training/adaptation system 200.

In some implementation, the runtime printing system 100 is operated in an "open loop" or "feedforward" manner in which the predistorter 115 does not directly have information about how previous parts of the object have been fabricated. In other embodiments, as illustrated n FIG. 1 (with dotted lines representing optional paths associated with feedback), a scanner 150 is schematically illustrated in a configuration that is used to determine scan data 155 representing the result of the fabrication of the object, with this data representing the geometry and/or material of the surface or near-surface section (e.g., material composition or density as a function of depth). In an example of such a feedback arrangement, the scanner 150 determines scan data 155 representing the surface 171 of a previously fabricated part 170 of the object. This scan data 155 is provided as a second input to the predistorter 115, thereby enabling the predistorter to compensate not only for non-ideal characteristics of the printer 125 that will affect the fabrication of the next part 175 of the object but also to compensate for non-ideal results of fabricating the part 170.

Turning now to the training/adaptation system 200 shown in FIG. 1, in general, a learner 210 is used to determine the parameters Θ 225 that configure the predistorter 115. A variety of implementations of the learner are discussed in the appended document. It should also be understood that different configurations of input can be used for various embodiments of the learner.

In one type of learner 210, the input to the learner is training data that includes a set of specification 220 and scan data 256 pairs. Each such pair resulted for use of the printer 125 to process the specification to fabricate a part (or whole) of an object, with that fabricated part being scanned by a scanner 150 (i.e., either the scanner 150 used in printing or an equivalent scanner) resulting in the scan data 256. The training data may have hundreds, thousands, or more such pairs. For example, as illustrated by the dotted lines from specification 120 the specification 220 and from scan data 155 to the scan data 256, a printer (or multiple printers) may be monitored in operation and the training data collected for later processing. Very generally, the learner 210 processes all these pairs of the training data and determines the parameters 225 to configure the predistorter 115 such that if an input to the predistorter represents an object with structure corresponding to the scan data 256, the output of the predistorter corresponds to the specification 220. In some examples of a learner 210, the learner estimates parameters of a predictor of the printer 125 such that this predictor approximates the mapping from the specifications 220 to the corresponding scan data 256. The parameters 225 that are output from the learner essentially configure the predistorter to act as a preinverse of this predictor such that the cascade of the predistorter and the predictor are as close to an identity predistorter as possible.

As introduced above, in some "feedback" arrangements, the predistorter 115 can have two inputs: the specification 105 of the part to be fabricated, and scan data 155 of the part of the object that is already fabricated. For such arrangements, the learner 210 determines the parameters 225 to process these two inputs to yield the modified specification 120. To do so, the training data includes triples, each including: scan data 155 for the part of the object already fabricated; the specification 220 provided to the printer 125; and the resulting scan data 256 after the part corresponding to specification 220 has been fabricated. In an analogous manner when there is no feedback, the learner 210 processes all the triples of the training data and determines the parameters 225 to configure the predistorter 115 such that if an input to the predistorter represents an object with a structure corresponding to the scan data 256 and the scan data 255, the output of the predistorter corresponds to the specification 220. In some examples of a learner 210, the learner estimates parameters of a predictor of the printer 125 such that this predictor approximates the mapping from the specifications 220 and scan data 255 to the corresponding scan data 256, and the parameters 225 that are output from the learner essentially configures the predistorter to act as a preinverse of this predictor such that the cascade of the predistorter and the predictor are as close to an identity predistorter as possible.

In some implementations, the training data is collected and processed in a batch to determine the parameters 225. In other implementations, the system may adapt during the printing of an object. The parameters 225 are updated as the object is being printed, thereby being responsive to possible changes in the printing process as compared to those used in the earlier collection of training data.

In the following further discussion, the following terminology, which is consistent with the terminology used above, is generally used. An object with specification X for the entire completed object is fabricated as a sequence of partial objects with specifications $X_1, X_2, \ldots$ such that an increment ("slice" or set of slices) $x_n$ between two successive partial objects is ideally deposited essentially as an increment to form a combination (represented by an addition symbol) $X_n = X_{n-1} + x_n$. Each slice $x_n$ is used to control a printer to deposit material, thereby forming the sequence of partial objects, with scans $Z_1, Z_2, \ldots$ and corresponding inferred fabricated slices (i.e., the achieved increments) $z_n = Z_n - Z_{n-1}$. In the ideal case, the printer exactly produces $z_n = x_n$, for each slice.

The physical printer can be represented in a first form as a transformation H of a commanded slice $x_n$ (which may be printed in one or more layers by the printer that is, a slice is not in general limited to a single printing layer) yielding a fabricated slice with an incremental scan $z_n$, represented in a functional form as $z_n = H(x_n)$. In some contexts the physical printer is viewed in a second form as a transformation that inputs the previous partially fabricated object, which has a scan $Z_{n-1}$, as well as the next slice $x_n$, and yields the scan of the next partial object, $Z_n$. This can be represented in a functional form as $Z_n = H(x_n, Z_{n-1})$. That is, the printer is represented as adding a layer to the existing partially fabricated part and yielding the next successive partially fabricated part.

In some examples below, it is useful to explicitly represent a simulation $\hat{H}$, which is meant to model the physical printer. This simulation may be parameterized, and the parameters of the simulation are denoted $\Theta_{\hat{H}}$. In some examples, this simulation is a "physical" simulation explicitly representing physical phenomena (e.g., material flow, shrinkage, etc.), while in other examples, the simulation is based on a machine learning approach in which the parameters are estimated based on a training set, while in yet other examples, the simulation may make use of a combination of components (e.g., applied in sequence) of one or both types.

As introduced above, a predistorter is used to compensate for the imperfections of the physical printer. The terms "predistort" and "predistorter" should be understood broadly to include any transformation that compensates for characteristics of the printer. In some example below, the predistorter can be represented in a first form as a transformation G of a desired slice $x_n$ to yield a predistorted slice $y_n$ such that passing $y_n$ through the physical printing process will yield the desired slice $z_n \approx x_n$. That is, this can be represented in a functional form as $H(G(x_n)) \approx x_n$, where effectively G is a "pre-inverse" $G \approx H^{-1}$. The parameters of the predistorter are denoted $\Theta_G$. In a second form of the predistorter, which may be referred to as a "feedback" form, the inputs are the partially fabricated object with $Z_{n-1}$ and the desired next partially fabricated object $X_n$, and output is the next commanded slice $y_n$ to be used to control the printer. In functional form, this can be represented as $y_n = G(X_n, Z_{n-1})$, with the goal that $H(G(X_n, Z_{n-1}), Z_{n-1}) \approx X_n$.

Note that in feedback without any predistortion, the feedback mechanism can be considered to be a comparison of a scan of a previously fabricated portion, $Z_{n-1}$, and the next desired portion, $X_n$, with the command to the printer being the difference $y_n = X_n Z_{n-1}$. This difference can be thought of as somewhat of a degenerate predistorter $y_n = G(Z_{n-1}, X_n) = X_n - Z_{n-1}$.

In yet a third form of the predistorter G, the inputs include the ultimate desired object, represented as X (i.e., rather than the next partial object $X_n$), and the predistorter uses the current partial scan, $X_{n-1}$ and generates the next command $y_n$ to advance to the desired object. Essentially, this moves part of a planning (e.g., "slicing") process that is performed for printing into the parameterized transformation, permitting it to be optimized.

In some implementations, the characteristics of the printer H depend on various environmental or state variables. Examples may include ambient temperature, individual jet characteristics (e.g., degree of clogging) etc. In some implementations, changes in such variables may be captured by updating the parameters $\Theta_{\hat{H}}$ and $\Theta_G$. In other implementations they are explicitly measured or estimated, and may be represented as $m_n$ or $\hat{m}_n$, and provided as a further input to $\hat{H}$ and G.

As discussed in more detail below, the transformations G and $\hat{H}$ may be parameterized with the parameters adjusted according to the design criteria, which may be referred to as optimization or loss functions. For example, these transformations may be implemented as artificial neural networks, such as deep convolutional neural networks. In the representation above, an input $x_n$ may take various representations, including but not limited to samples of thickness over a grid of two-dimensional locations, or a vector of material composition over the grid, with each position in the vector being associated with an amount or concentration of a different material. In some implementations, an input $x_n$ or $X_n$ is represented over a three-dimensional array of locations, for example, representing individual voxels. In some implementations, the output of the predistorter G has the same characteristics as its input. For example, it may form a mapping from desired thickness as a function of location to a commanded thickness as a function of location. However, in other implementations, an input $y_n$ to the printer H or its simulations H may be in the form of printer commands, such as print-head commands, velocity, etc., and the "predistorter" effectively implements a transformation from a desired structure to printer commands.

A number of specific approaches are described below, generally following the terminology and notations introduced above.

2 Additive Manufacturing Using a Machine Learning Based Predistorter

2.1 Runtime Operation

Figure 2:
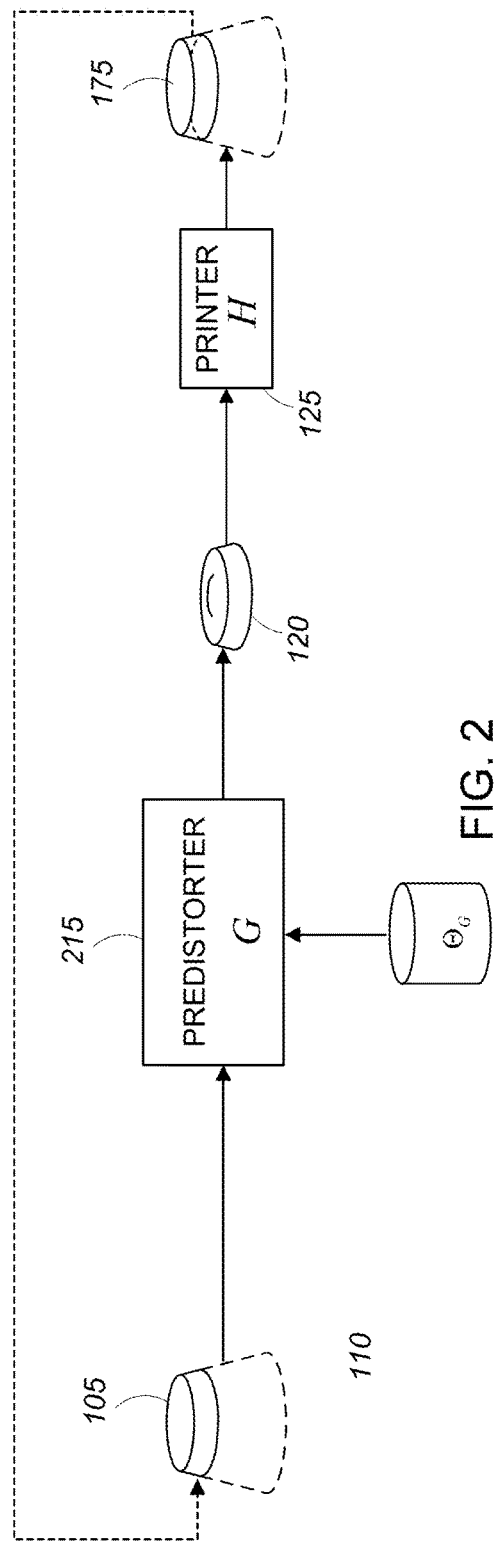
FIG. 2 is a first, machine learning-based configuration of the system of FIG. 1.
Figure 3:
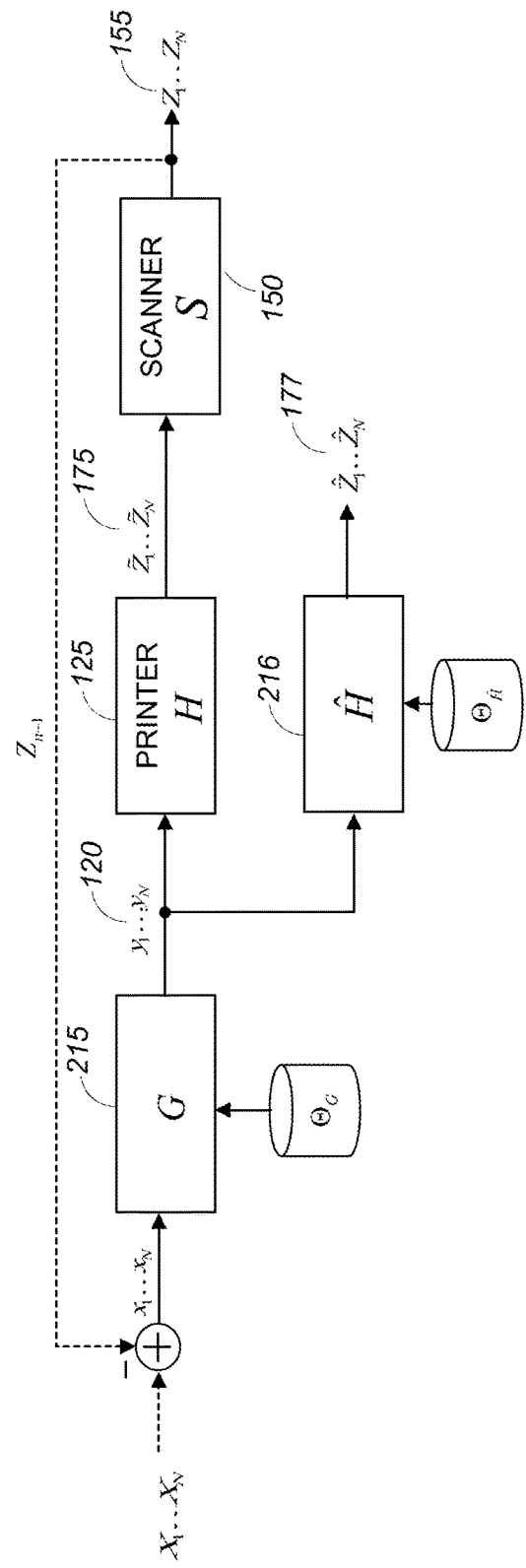
FIG. 3 is the first machine learning-based configuration of the system of FIG. 1 including a printer simulator.

Referring to FIGS. 2 and 3, another exemplary additive manufacturing approach uses a machine learning based predistorter to improve the quality of objects manufactured using the process.

In the approach shown in FIG. 2, an input specification 105 of the object to be fabricated is provided to a machine learning based predistorter G 215 that is configured according to parameters $\Theta_G$. The predistorter G 215 processes the input specification 105 to generate a corresponding modified input specification 120. The modified input specification 120 is provided to a printer H 125 which prints a fabricated part 175 according to the modified input specification 120.

In some examples, a representation (e.g., a scan) of fabricated part 175 is fed back to the beginning of the printing process and is used to adjust the input specification 105 before the input specification 105 is provided to the predistorter G 215. For example, the input specification 105 may be adjusted to compensate for printing errors that occurred when printing the fabricated part 175.

As is described above, the machine learning based predistorter 215 essentially forms an inverse (a "pre-inverse") of a printing process associated with the printer 125, such that a given modified input specification 120 that is provided to the printer 125 results in a fabricated part 175 that matches the original input specification 105.

One reason for using a machine learning based predistorter 215 is that conventional additive manufacturing processes often produce objects that deviate from the input 3D specifications of the objects due to micro-scale physical effects not accounted for by the manufacturing process such as flowing of liquid material, coalescing of droplets, surface tension etc. These physical phenomena may result in manufactured objects with inaccurate dimensions, rounded features and missing features. The machine learning based predistorter 215 automatically characterizes the physical phenomena without requiring complex physics-based modeling of the material behavior and uses machine learning models to modify input models such that the manufacturing process can faithfully reproduce the input models.

Referring to FIG. 3, a schematic diagram of the process shown in FIG. 2 includes the machine learning based predistorter G 215, the printer H 125, a scanner 150, and a simulation of the printer $\hat{H}$ 216.

In a more detailed description of the printing process, a series of one or more desired input specifications $(x_1 \ldots x_N)$ 105 of some or all of an object to be fabricated is provided to the machine learning based predistorter G 215 that is configured according to parameters $\Theta_G$. The predistorter G 215 processes the input specifications 105 to generate a corresponding series of one or more modified input specifications $(y_1 \ldots y_N)$ 120. The series of modified input specifications 120 is provided to a printer H 125 which prints a series of one or more fabricated parts $(\tilde{Z}_1 \ldots \tilde{Z}_N)$ according to the series of one or more modified input specifications 120. The fabricated parts 175 are scanned using a scanner 150 (e.g., an optical scanner) producing the successive scans $Z_1 \ldots Z_N$.

The modified input specifications 120 may also be provided to the simulation of the printer $\hat{H}$ 216, which processes the modified input specifications 120 to generate predicted fabricated parts $\hat{Z}_1 \ldots \hat{Z}_N$ 177. The simulation $\hat{H}$ 216 is used for training purposes, as is described in greater detail below.

In some examples, a series of scans $\tilde{Z}_1 \ldots \tilde{Z}_N$ 155 of the fabricated parts 175 is fed back to the beginning of the printing process. At the beginning of the printing process the scans 155 may be combined with object specifications $X_1 \ldots X_N$ to form adjusted input specifications 105 that represent the increments $(x_1 \ldots x_N)$ to be printed. It is those increments that are provided to the predistorter G 215.

2.2 Training

In FIG. 3, the use of both a machine learning based predistorter G 215 and a machine learning based simulator $\hat{H}$ 216 may improve the fidelity of manufactured objects. In some examples, to train the predistorter G 215 and the simulator $\hat{H}$ 216, training data is collected from the printing of previous objects and the collected training data is used to determine predistorter parameters $\Theta_G$ for the predistorter G 215 and simulation parameters $\Theta_{\hat{H}}$ for the simulator $\hat{H}$ 216.

For example, training data includes a number of corresponding pairs $(y_i, z_i)$, where $z_i$ is the difference between successive scans (e.g., represented as $Z_i - Z_{i-1}$) representing the incremental result of printing according to the input $y_i$, of modified input specifications 120 and scans 155 are stored during one or more previous printing passes. That training data is then processed in a batch training procedure to determine predistorter parameters $\Theta_G$ for the predistorter G 215 and simulation parameters $\Theta_{\hat{H}}$ for the simulator $\hat{H}$ 216.

Figure 4:
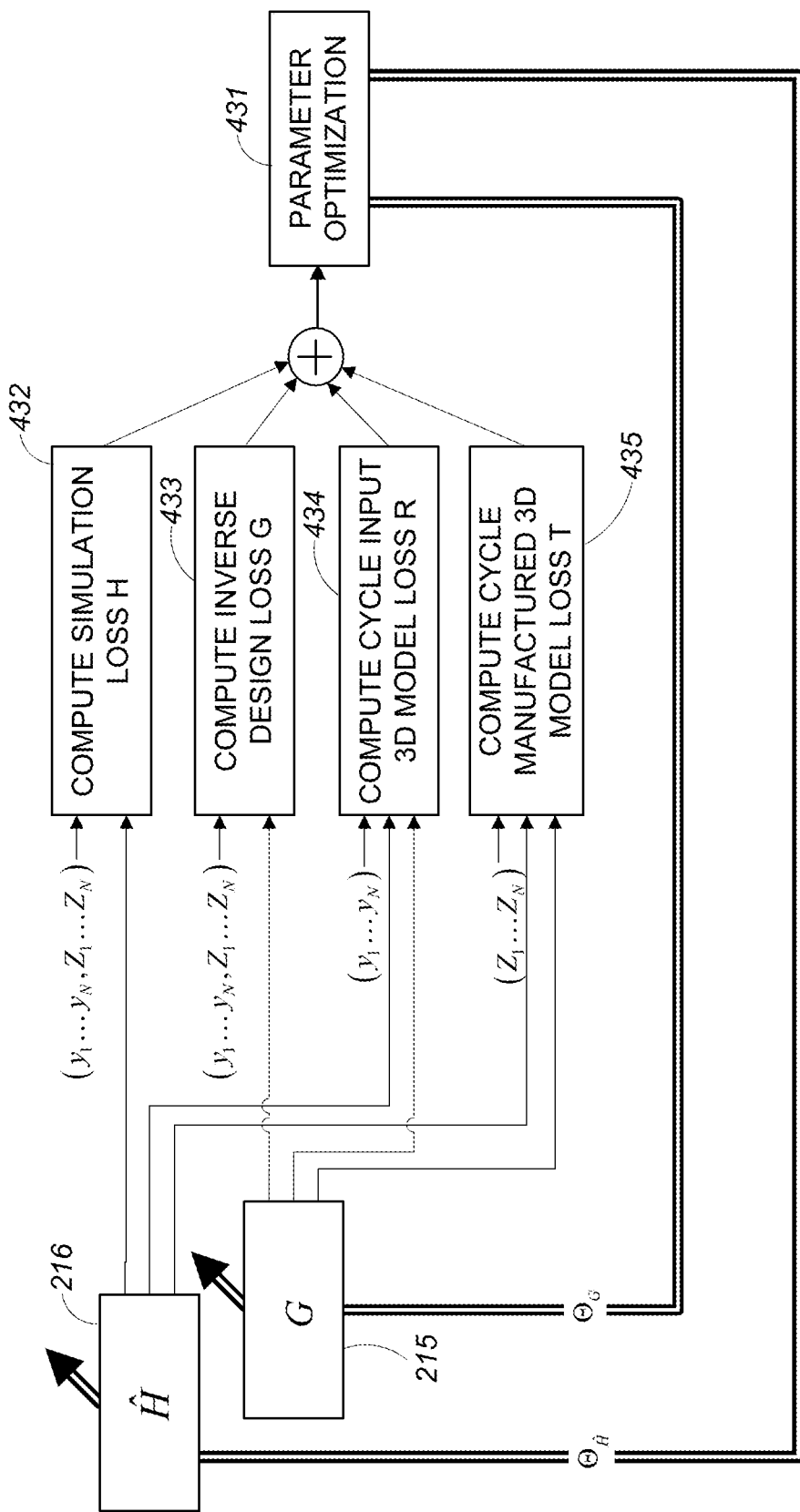
FIG. 4 is a training system for training the first, machine learning-based configuration.

Referring to FIG. 4, in one example of such a training procedure, a combined loss 430 is determined as a sum (or weighted sum) of a simulation loss, an inverse design loss, a cycle input 3D model loss, and a cycle manufactured 3D model loss. That combined loss is provided to parameter optimization module 431 that determines the updated predistorter parameters $\Theta_G$ and the updated simulation parameters $\Theta_{\hat{H}}$.

In some examples, the parameter optimization module 431 determines the parameters $\Theta_G$ and $\Theta_{\hat{H}}$ by using an optimization algorithm to iteratively update the parameters $\Theta_G$ and $\Theta_{\hat{H}}$ until some stopping criteria (e.g., number of iterations, convergence). One common way of updating model parameters involves computing/estimating gradients of the combined loss function with respect to the model parameters. For example, a backpropagation algorithm for an artificial neural networks uses such gradient estimates. Of course, other parameter update schemes can be used.

2.2.1 Simulation Loss Computation

Figure 5:
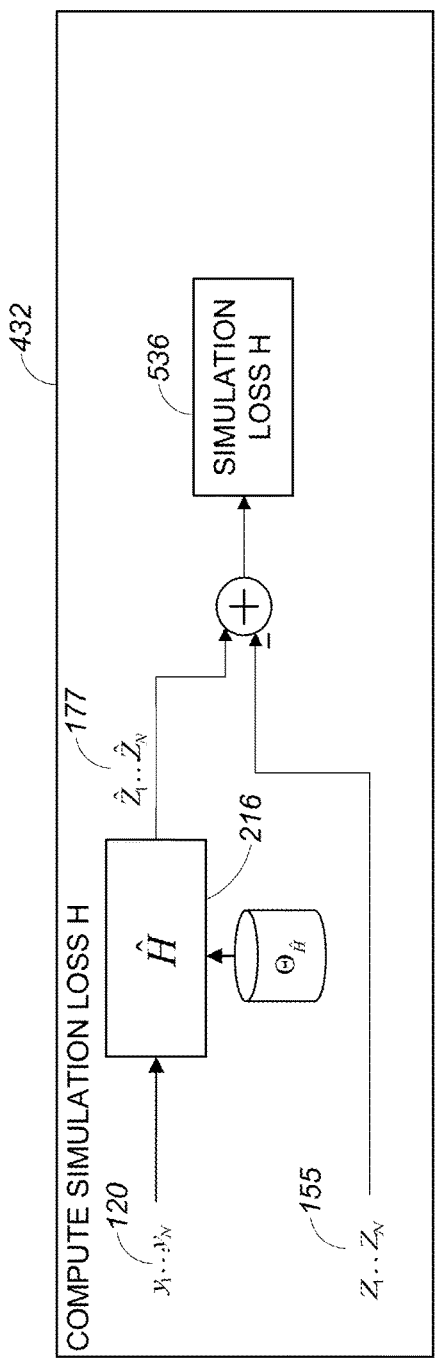
FIG. 5 is a simulation loss computation module.

Referring to FIG. 5, the simulation loss measures how well the simulator H 216 approximates the printer H 125. To compute the simulation loss, a compute simulation loss module 432 (see FIG. 4) receives training data including scans $(Z_1 \ldots Z_N)$ 155 and modified input specifications $(y_1 \ldots y_N)$ 120. The modified input specifications 120 are provided to the simulator $\hat{H}$ 216 as input and the simulator $\hat{H}$ 216 generates corresponding predicted fabricated parts $(\hat{Z}_1 \ldots \hat{Z}_N)$ 177. The simulation loss 536 is computed as a difference between the incremental scans $(z_1 \ldots z_N)$ 155 and the predicted incremental fabricated parts $(\hat{z}_1 \ldots \hat{z}_N)$ 177. There are different ways of computing this difference, for example, as difference between models in voxel space, Hausedorff distance, etc..

2.2.2 Inverse Design Loss Computation

Figure 6:
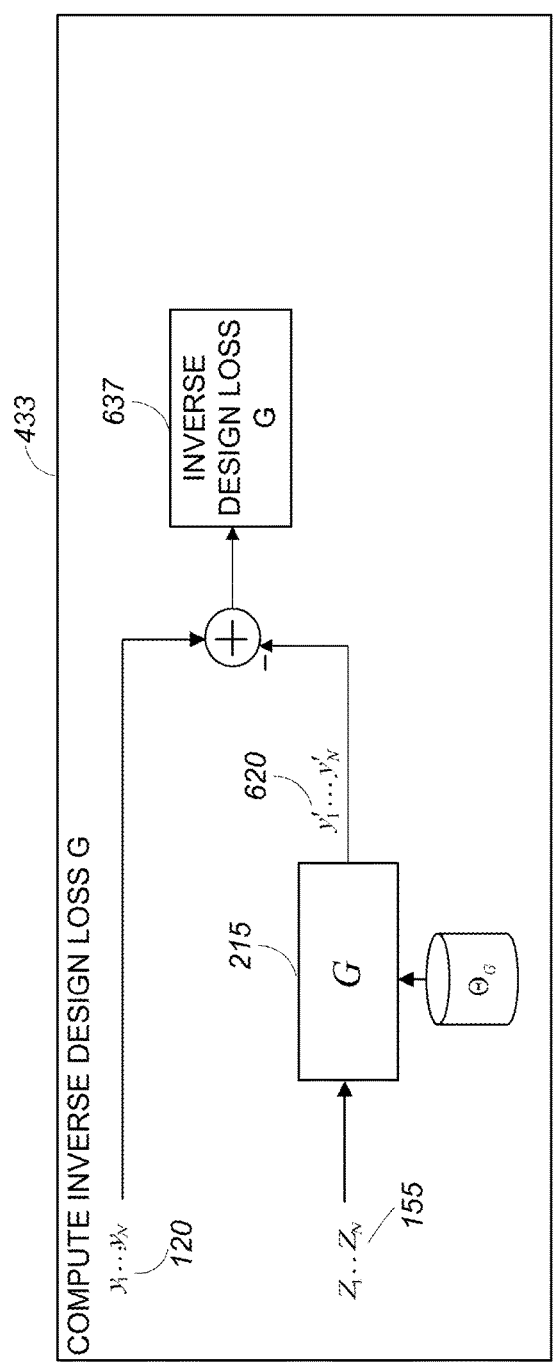
FIG. 6 is an inverse design loss computation module.

Referring to FIG. 6, to compute the inverse design loss, a compute inverse design loss module 433 (see FIG. 4) receives training data including incremental scans $(z_1 \ldots z_N)$ 155 and modified input specifications $(y_1 \ldots y_N)$ 120. The scans 155 are provided to the predistorter G 215 as input, and the predistorter G 215 generates corresponding predicted modified input specifications $(y'_1 \ldots y'_N)$ 620. The inverse design loss 637 is computed as a difference between the modified input specifications $(y_1 \ldots y_N)$ 120 and the predicted modified input specifications $(y'_1 \ldots y'_N)$ 620.

2.2.3 Cycle Input 3D Model Loss Computation

Figure 7:
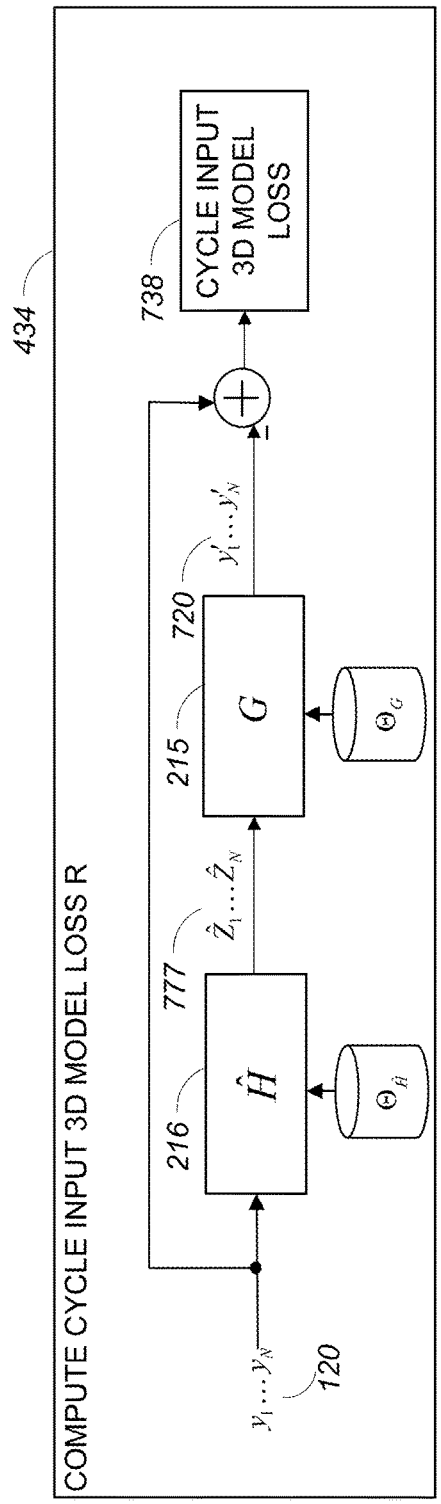
FIG. 7 is a cycle input 3D model loss computation module

Referring to FIG. 7, the compute the cycle input 3D model loss is used to ensure consistency between the simulator $\hat{H}$ 216 and the predistorter G 215. This loss bridges the two machine learning models so that they can improve each other. By doing so, both models generalize better to unseen data.

To compute the cycle input 3D model loss, a compute cycle input 3D model loss module 434 (see FIG. 4) receives the modified input specifications $(y_1 \ldots y_N)$ 120. The modified input specifications 120 are provided as input to the simulator $\hat{H}$ 216, which uses them to generate corresponding predicted incremental fabricated parts $(\hat{z}_1 \ldots \hat{z}_N)$ 177. The predicted fabricated parts 177 are provided to the predistorter G 215 which uses them to generate predicted modified input specifications $(y'_1 \ldots y'_N)$ 720. The cycle input 3D model loss 738 is computed as a difference between the modified input specifications $(y_1 \ldots y_N)$ 120 and the predicted modified input specifications $(y'_1 \ldots y'_N)$ 620.

2.2.4 Cycle Manufactured 3D Model Loss Computation

Figure 8:
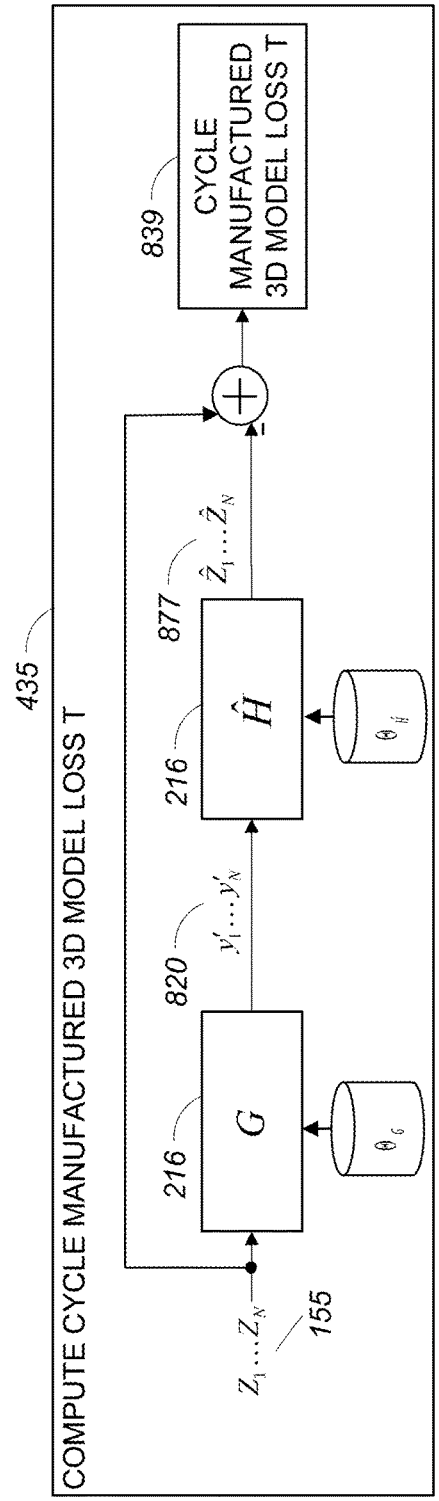
FIG. 8 is a cycle manufactured 3D model loss computation module.

Referring to FIG. 8, to compute the cycle manufactured 3D model loss, a compute cycle manufactured 3D model loss module 435 (see FIG. 4) first receives the scans $(Z_1 \ldots Z_N)$ 155 as input. The scans 155 are provided to the predistorter G 215 which uses them to generate predicted modified input specifications $(y'_1 \ldots y'_N)$ 820. The predicted modified input specifications 820 are provided to the simulator $\hat{H}$ 216, which uses them to generate corresponding predicted incremental fabricated parts $(\hat{z}_1 \ldots \hat{z}_N)$ 177. The cycle manufactured 3D model loss 839 is computed as a difference between the scans 155 and the predicted incremental fabricated parts $(\hat{z}_1 \ldots \hat{z}_N)$ 177.

2.2.5 Online Training

Figure 9:
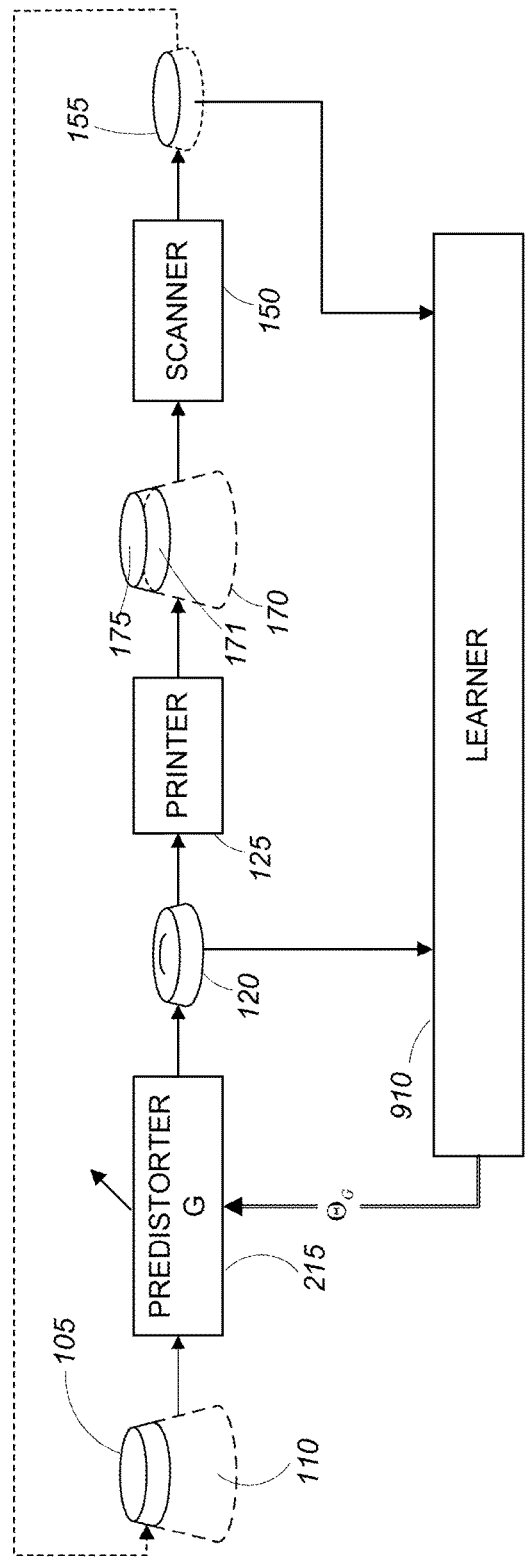
FIG. 9 is the first, machine learning-based configuration of the system of FIG. 1 including an online learner module.
Figure 10:
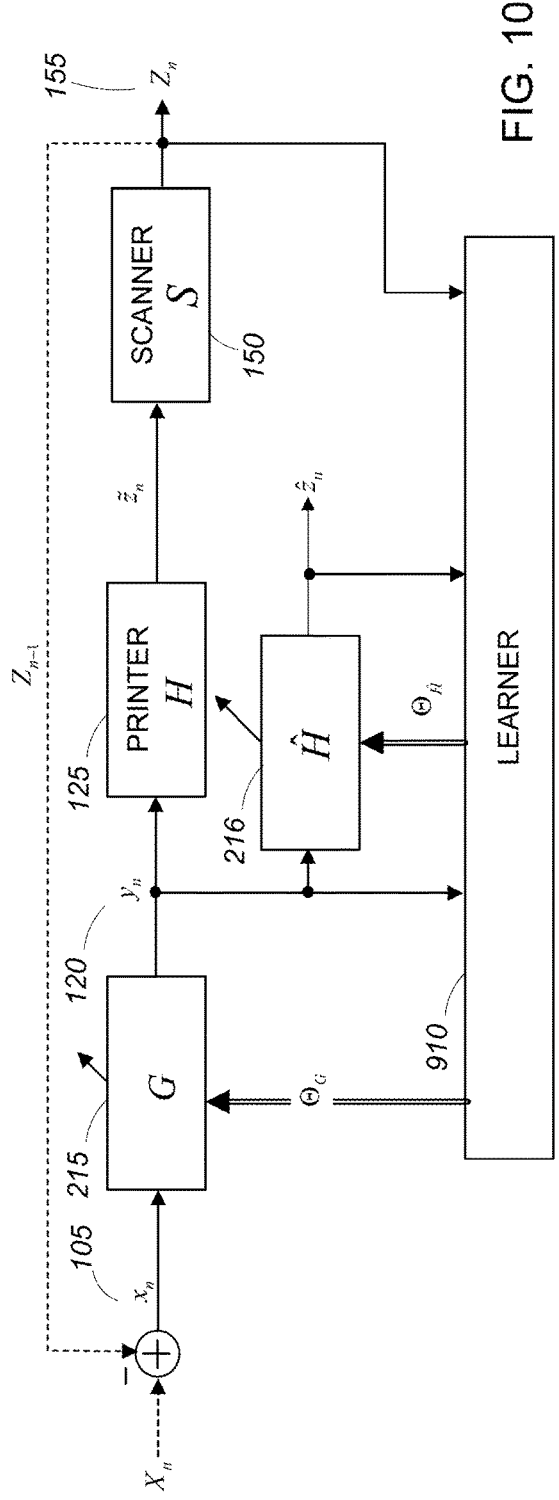
FIG. 10 is the first, machine learning-based configuration of the system of FIG. 1 including a printer simulator and an online learner module.

Referring to FIGS. 9 and 10, the examples described above are related to a scenario where all of the training data is collected in advance, and training is performed in "batch" matter prior to deployment of the runtime system. However, in some examples, some or all of the training of the predistorter G 215 and the simulator $\hat{H}$ 216 is performed as objects are printed (i.e., "online training").

In FIGS. 9 and 10, the printing process shown in FIG. 2 is updated to include a learner module 910. Very generally, the learner module 910 receives modified input specifications $(y_n)$ 120 and scans $(Z_n)$ 155 from the printing process as it progresses and repeatedly updates the parameters $\Theta_G$ and $\Theta_{\hat{H}}$ using the data that it has received up to that point. In some examples, the parameters $\Theta_G$ and $\Theta_{\hat{H}}$ are updated after each printing pass. In other examples, the parameters $\Theta_G$ and $\Theta_{\hat{H}}$ are updated every n printing passes, or according to a predefined time interval.

In general, the updates made by the learner module 910 are performed using the training techniques described above but adapted to operate efficiently in a continuous and parameter updating scheme.

3 Additive Manufacturing Using a Feedback Loop and Machine Learning

The additive manufacturing process described above improves manufacturing accuracy by accounting for systematic errors that are consistent from printing pass to printing pass. These errors are determined by the physical behavior of print materials and the manufacturing process. There is another significant source of error known as random error that varies from layer to layer. Random errors are affected by the precision of a positioning system, or the printhead condition such as clogging of nozzles, fluctuation in ambient temperature, etc. To account for these types of errors, the machine learning model is augmented in real-time using feedback on the manufacturing progress. One way of providing real-time feedback is to scan the partially manufactured part during printing and use the information to directly generate input to the manufacturing process.

3.1 Runtime Operation

Figure 11:
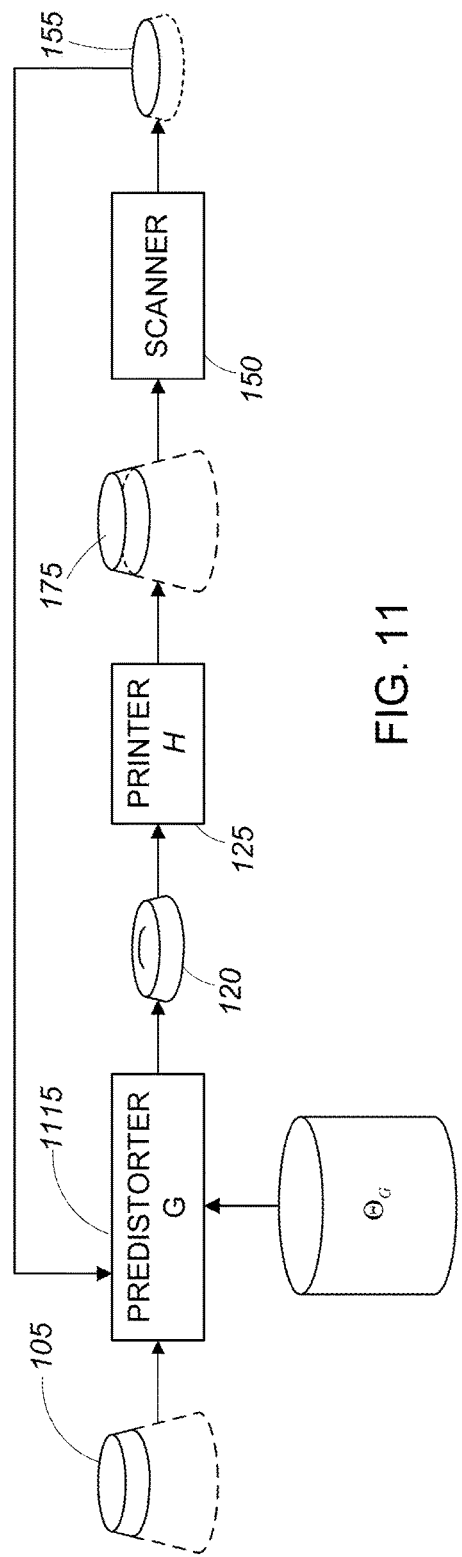
FIG. 11 is a second, feedback-based configuration of the system of FIG. 1.
Figure 12:
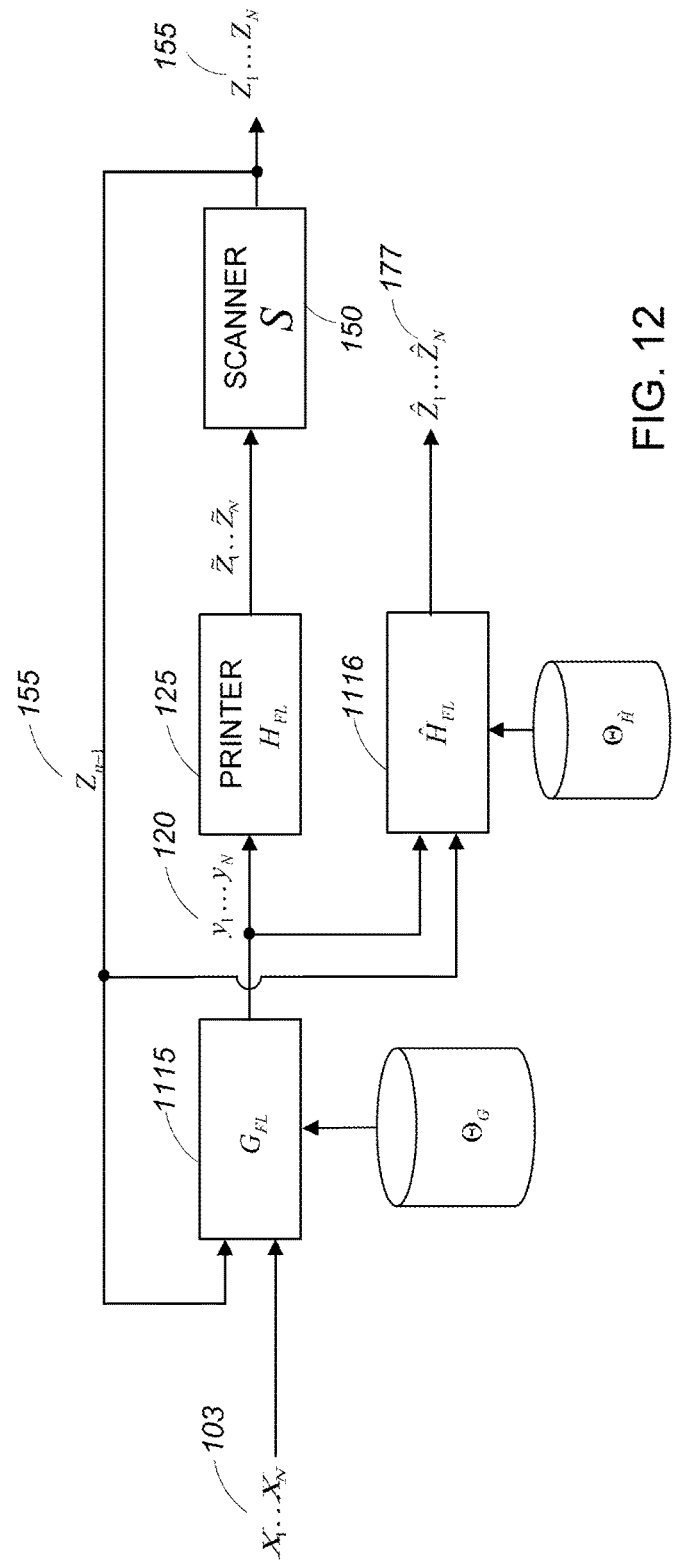
FIG. 12 is the second, feedback-based configuration of the system of FIG. 1 including a printer simulator

Referring to FIGS. 11 and 12, another exemplary approach of an additive manufacturing process uses a machine learning based predistorter that is configured to receive scans of objects fabricated in previous printing passes as an additional input.

In the approach shown in FIG. 11, an input specification 105 of the object to be fabricated and a scan 155 of the object fabricated in the previous printing pass are provided to a predistorter $G_{FL}$ 1115 that is configured according to parameters $\Theta_G$. The predistorter $G_{FL}$ 1115 processes the input specification 105 and the scan 155 to generate a corresponding modified input specification 102. The modified input specification 120 is provided to a printer H 125 which prints a fabricated part 175 according to the modified input specification 120.

The fabricated part 175 is scanned by a scanner (e.g., an optical scanner) 150 which generates a scan 155 of the newly fabricated part 175. The new scan 155 is fed back to the predistorter $G_{FL}$ 1115 for use in the next printing pass.

Very generally, by configuring the predistorter $G_{FL}$ 1115 to use both the scan 155 and the input specification 105 to generate the modified input specification 120, the machine learning model is able to mitigate both systematic and random print defects for example by adding material to under-printed areas, reducing material in over-printed areas, sharpening edges etc.

Referring to FIG. 12, a schematic diagram of the process shown in FIG. 11 includes the predistorter $G_{FL}$ 1115, the printer H 125, the scanner 150, and a simulation of the printer $\hat{H}_{FL}$ 1116.

In a more detailed description of the printing process, a sequential series of object specifications $X_1 \ldots X_N$ 103 and corresponding scans 155 from previous runs $Z_{n-1}$ are provided to the predistorter $G_{FL}$, 1115, which is configured according to parameters $\Theta_G$. The predistorter $G_{FL}$ 1115 processes the object specifications 103 and the scans 155 to generate a corresponding series of modified input specifications $(y_1 \ldots y_N)$ 120. The series of modified input specifications 120 is provided to a printer H 125 which prints a series of one or more fabricated parts $(\tilde{Z}_1 \ldots \tilde{Z}_N)$ according to the series of one or more modified input specifications 120. The fabricated parts 175 are scanned using the scanner 150 and the next printing pass begins.

The modified input specifications 120 and the scans 155 may also be provided to the simulation of the printer $\hat{H}_{FL}$ 1116, which processes the modified input specifications 120 and the scans 155 to generate predicted fabricated parts $\hat{Z}_1 \ldots \hat{Z}_N$ 177. The simulator $\hat{H}_{FL}$ 1116 is used for training purposes, as is described in greater detail below.

3.2 Training

In some examples, to train the predistorter $G_{FL}$ 1115 and the $\hat{H}_{FL}$ 1116, training data is collected from the printing of previous objects and the collected training data is used to determine predistorter parameters $\Theta_G$ for the predistorter $G_{FL}$ 1115 and simulation parameters $\Theta_{\hat{H}}$ for the simulator $\hat{H}_{FL}$ 1116.

For example, training data including a number of triples $(y_i, Z_i, Z_{i-1})$ of modified input specifications $y_i$, current scans $Z_i$, and previous scans $Z_{i-1}$ are stored during previous printing passes. That training data is then processed in a batch training procedure to determine predistorter parameters $\Theta_G$ for the predistorter $G_{FL}$ 1115 and simulation parameters $\Theta_{\hat{H}}$ for the simulator $\hat{H}_{FL}$ 1116.

Figure 13:
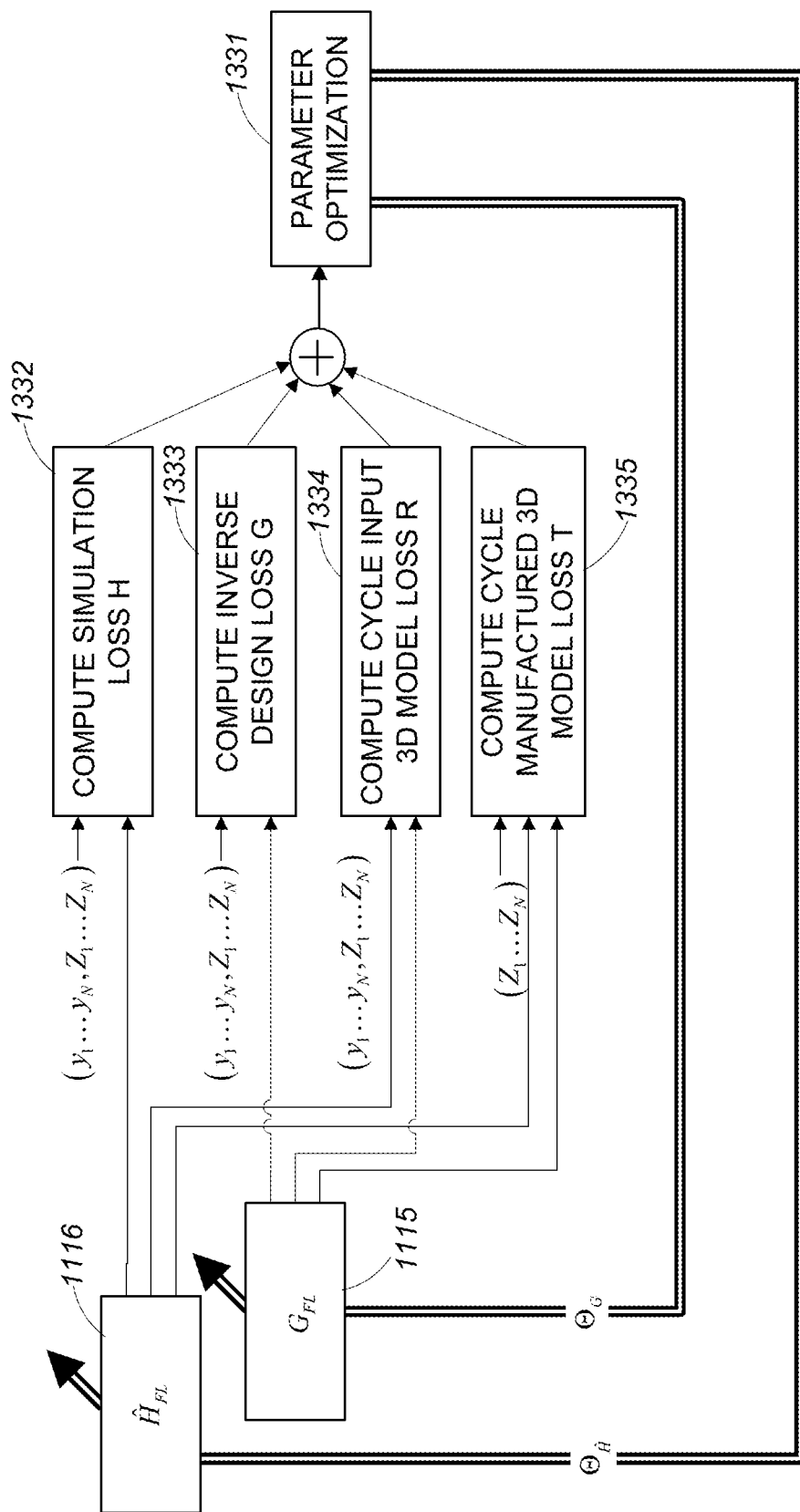
FIG. 13 is a training system for training the second, feedback-based configuration.

Referring to FIG. 13, in one example of such a training procedure, a combined loss 1330 is determined as a sum (or weighted sum) of a simulation loss, an inverse design loss, a cycle input 3D model loss, and a cycle manufactured 3D model loss. That combined loss is provided to parameter optimization module 1131 that determines the updated predistorter parameters $\Theta_G$ and the updated simulation parameters $\Theta_{\hat{H}}$.

In some examples, the parameter optimization module 1331 determines the parameters $\Theta_G$ and $\Theta_{\hat{H}}$ by using an optimization algorithm to iteratively update the parameters $\Theta_G$ and $\Theta_{\hat{H}}$ until some stopping criteria (e.g., number of iterations, convergence). One common way of updating model parameters involves computing/estimating gradients of the combined loss function with respect to the model parameters. For example, backpropagation algorithm for an artificial neural network uses these gradient estimates. Of course, other parameter update schemes can be used.

3.2.1 Simulation Loss Computation

Figure 14:
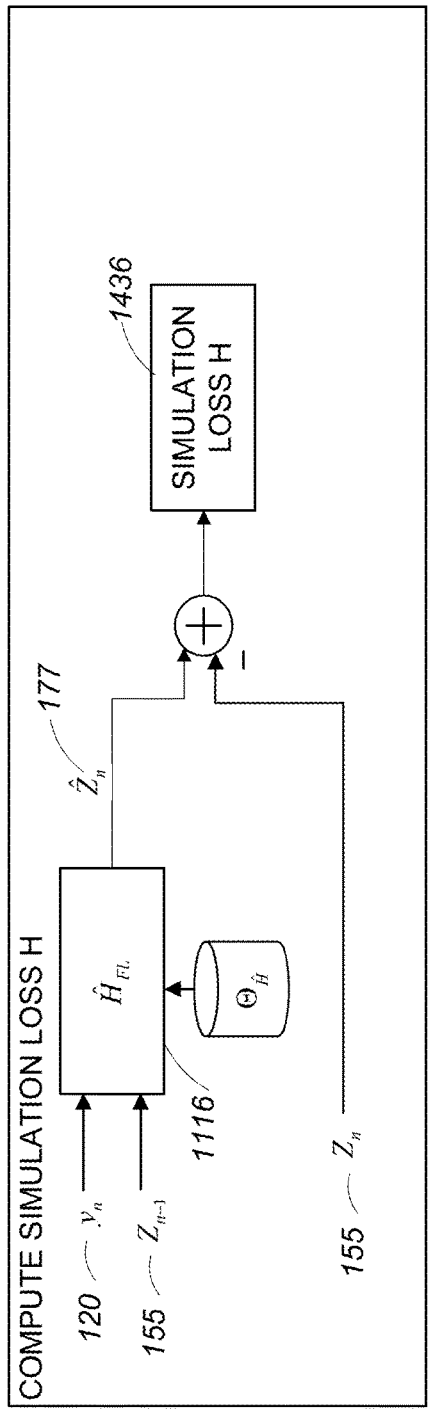
FIG. 14 is a simulation loss computation module.

Referring to FIG. 14, to compute the simulation loss, a compute simulation loss module 1132 (see FIG. 13) receives training data including triples of modified input specifications $y_i$ 120, current scans $Z_i$ 155, and previous scans $Z_{i-1}$ 155. The modified input specifications $y_i$ 120 and the previous scans $Z_{i-1}$ 155 are provided to the simulator $\hat{H}_{FL}$ 1116 as input and the simulator $\hat{H}_{FL}$ 1116 generates corresponding predicted fabricated parts $\hat{Z}_n$ 177. For each training triple, the simulation loss 1436 is computed as a difference between the current scan $Z_n$ 155 and the predicted fabricated part $\hat{Z}_n$ 177.

3.2.2 Inverse Design Loss Computation

Figure 15:
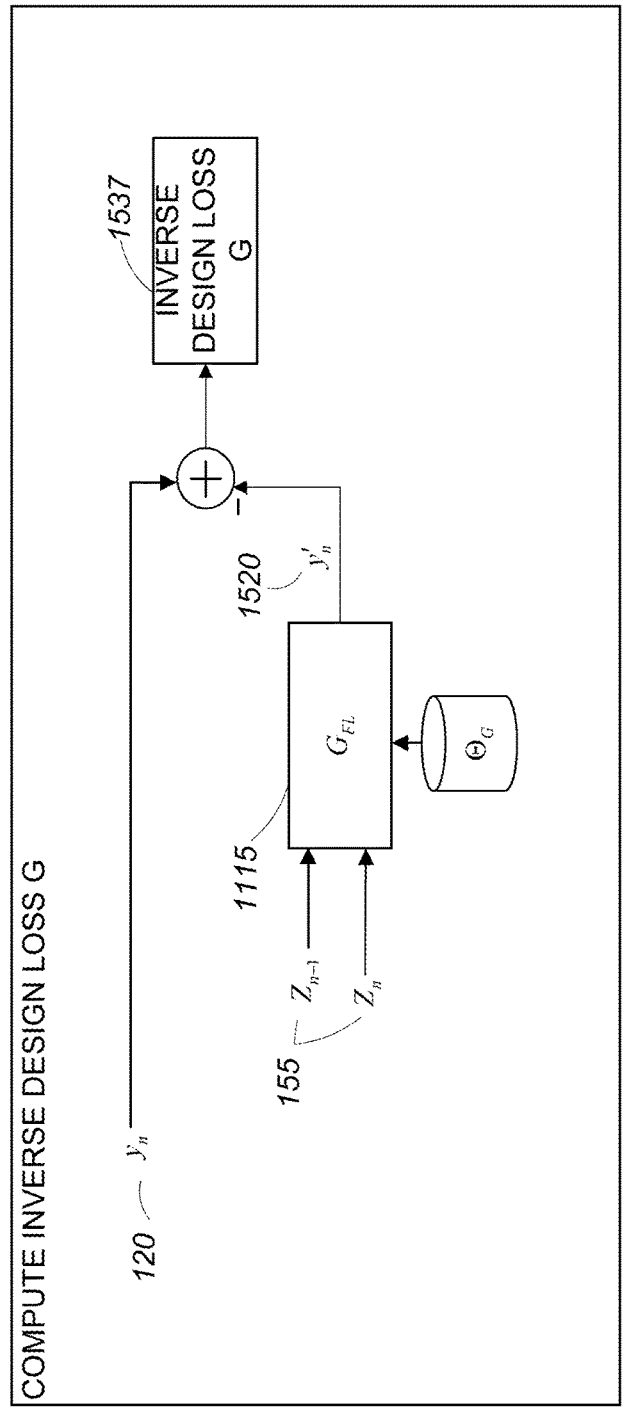
FIG. 15 is an inverse design loss computation module.

Referring to FIG. 15, to compute the inverse design loss, a compute inverse design loss module 433 (see FIG. 3) receives training data including triples of modified input specifications $y_i$ 120, current scans $Z_i$ 155, and previous scans $Z_{i-1}$ 155. The current and previous scans $Z_n, Z_{n-1}$ 155 are provided to the predistorter $G_{FL}$ 1115 as input, and the predistorter $G_{FL}$ 1115 generates corresponding predicted modified input specifications $y'_n$ 1520. For each training triple, the inverse design loss 1537 is computed as a difference between the modified input specification $y_n$ 120 and the predicted modified input specification $y'_n$ 1520.

3.2.3 Cycle Input 3D Model Loss Computation

Figure 16:
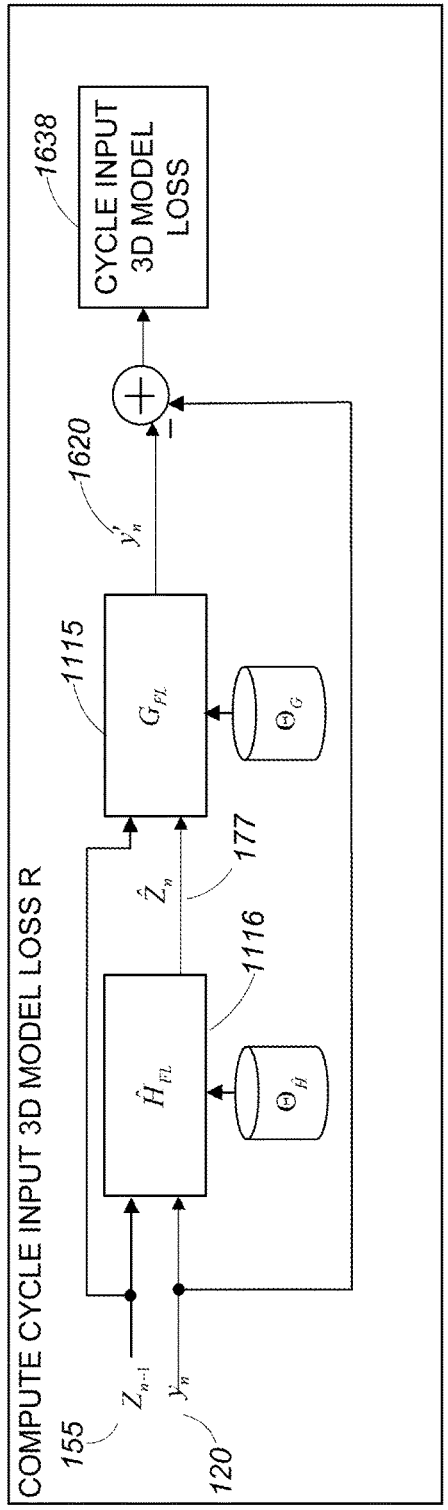
FIG. 16 is a cycle input 3D model loss computation module

Referring to FIG. 16, to compute the cycle input 3D model loss, a compute cycle input 3D model loss module 1334 (see FIG. 13) receives training data including pairs of modified input specifications $y_i$ 120 and previous scans $Z_{i-1}$ 155. For each training pair, the modified input specification 120 and the previous scan 155 are provided as input to the simulator $\hat{H}_{FL}$ 216, which uses them to generate a corresponding predicted fabricated part $\hat{Z}_n$) 177. The predicted fabricated part 177 is provided to the predistorter $G_{FL}$ 1115 which uses it to generate a predicted modified input specification $y'_n$ 1620. The cycle input 3D model loss 1638 is computed as a difference between the modified input specification $y_n$ 120 and the predicted modified input specification $y'_n$ 1620.

3.2.4 Cycle Manufactured 3D Model Loss Computation

Figure 17:
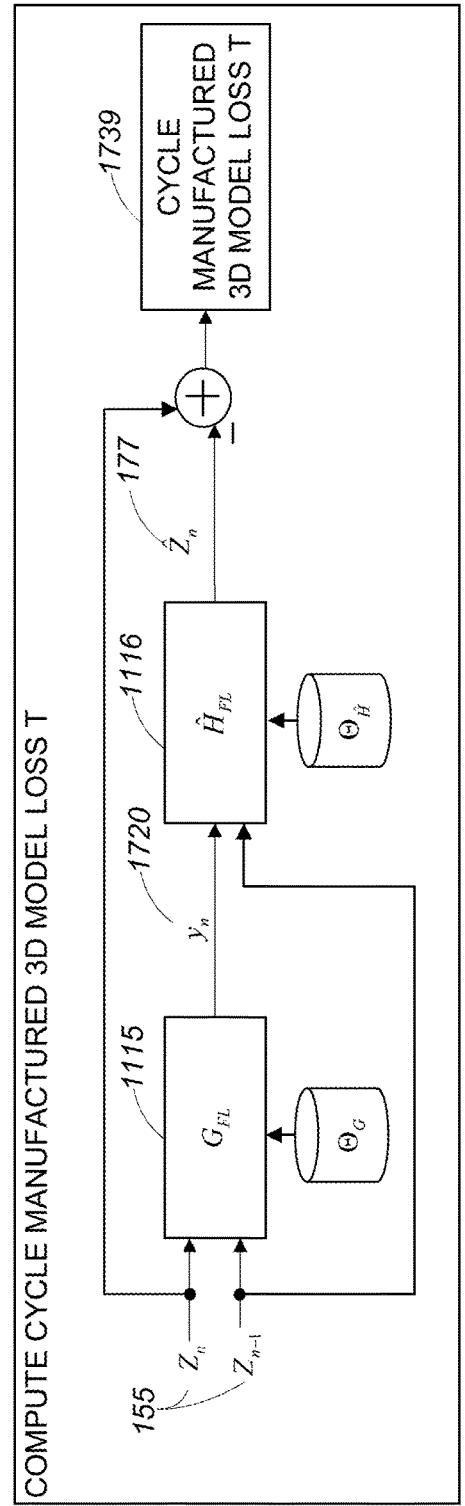
FIG. 17 is a cycle manufactured 3D model loss computation module.

Referring to FIG. 17, to compute the cycle manufactured 3D model loss, a compute cycle manufactured 3D model loss module 1335 (see FIG. 13) receives training data including pairs of previous and current scans $(Z_n, Z_{n-1})$ 155 as input. For each training data pair, the current scan $Z_n$ and the previous scan $Z_{n-1}$ are provided to the predistorter $G_{FL}$ 1115 which uses them to generate a predicted modified input specification $y'_n$ 1720. The predicted modified input specification $y'_n$ 1720 and the previous scan $Z_{n-1}$ are provided to the simulator $\hat{H}_{FL}$ 1116, which uses them to generate a corresponding predicted fabricated part $\hat{Z}_n$ 177. The cycle manufactured 3D model loss 1739 is computed as a difference between the current scan $Z_n$ 155 and the predicted fabricated part $\hat{Z}_n$ 177.

3.2.5 Online Training

Figure 18:
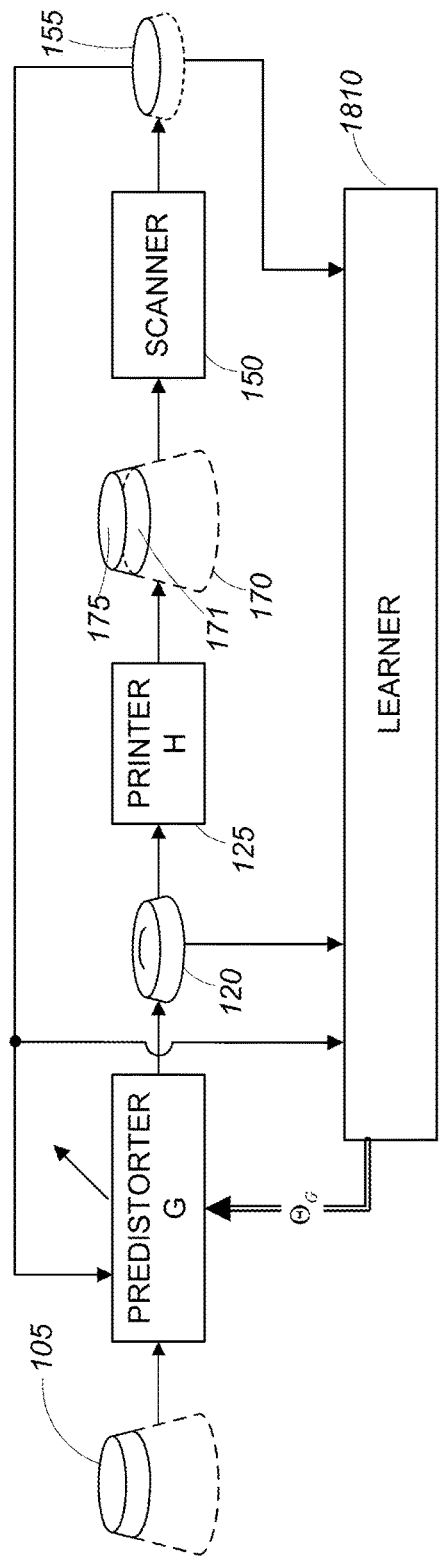
FIG. 18 is the second, feedback-based configuration of the system of FIG. 1 including an online learner module.
Figure 19:
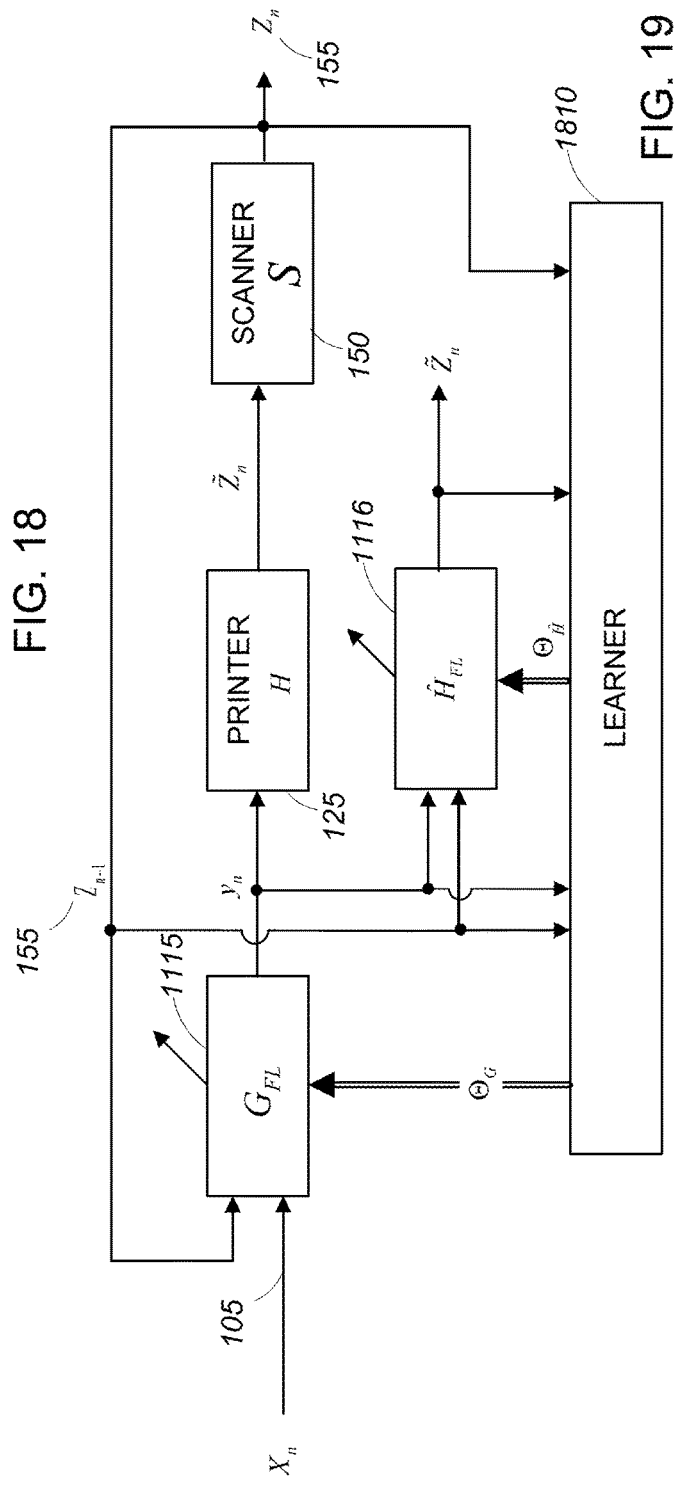
FIG. 19 is the second, feedback-based configuration of the system of FIG. 1 including a printer simulator and an online learner module.

Referring to FIGS. 18 and 19, the examples described above are related to a scenario where all of the training data is collected in advance, and training is performed in "batch" matter prior to deployment of the runtime system. However, in some examples, some or all of the training of the predistorter $G_{FL}$ 1115 and the simulator $\hat{H}_{FL}$ 1116 is performed as objects are printed (i.e., "online training").

In FIGS. 18 and 10, the printing process shown in FIG. 11 is updated to include a learner module 1810. Very generally, the learner module 910 receives modified input specifications ($y_n$) 120, scans ($Z_n$, $Z_{n-1}$) 155, and predicted fabricated parts $\hat{Z}_n$ 177 from the printing process as it progresses and repeatedly updates the parameters $\Theta_G$ and $\Theta_{\hat{H}}$ using the data that it has received up to that point. In some examples, the parameters $\Theta_G$ and $\Theta_{\hat{H}}$ are updated after each printing pass. In other examples, the parameters $\Theta_G$ and $\Theta_{\hat{H}}$ are updated every n printing passes, or according to a predefined time interval.

In general, the updates made by the learner module 910 are performed using the training techniques described above but adapted to operate efficiently in a continuous and parameter updating scheme.

4 ADDITIVE MANUFACTURING USING MACHINE STATE

In some examples, a machine state model is determined for the additive manufacturing printer described above. A machine state model is a quantitative description of the condition of the additive manufacturing printer hardware. In some examples, a machine state model includes metrics that affect print quality such as jetting volume of each nozzle, consistency of each nozzle, alignment of printheads and precision of the motion system.

Figure 20:
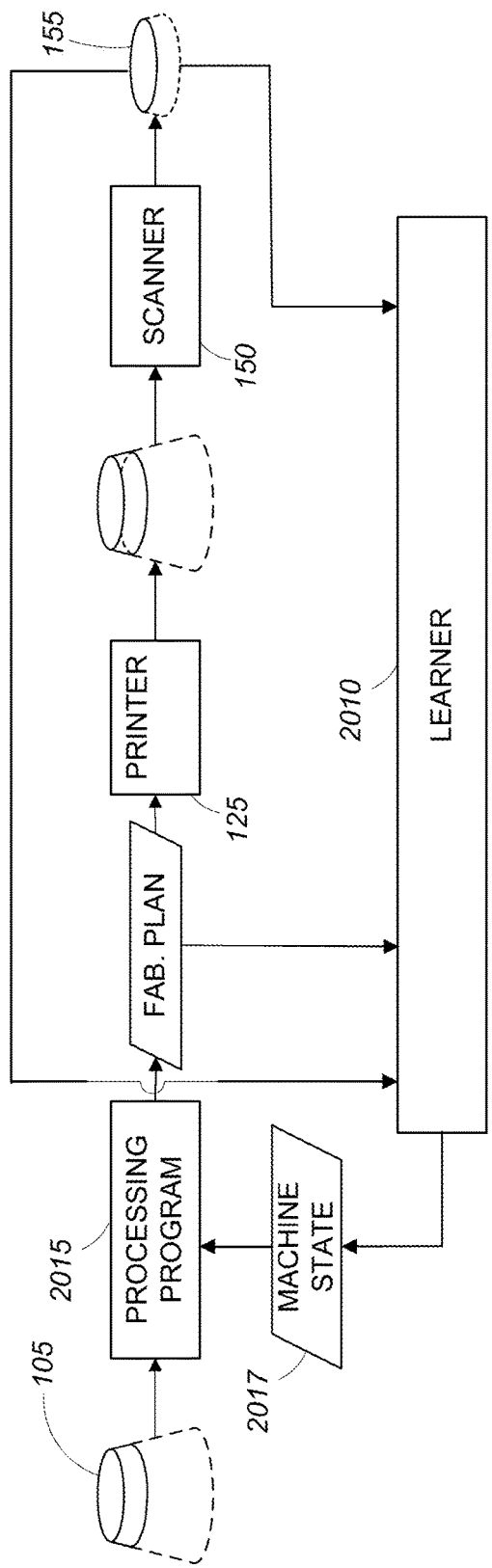
FIG. 20 is a third configuration of the system of FIG. 1 that uses estimated machine state to generate fabrication plans.
Figure 21:
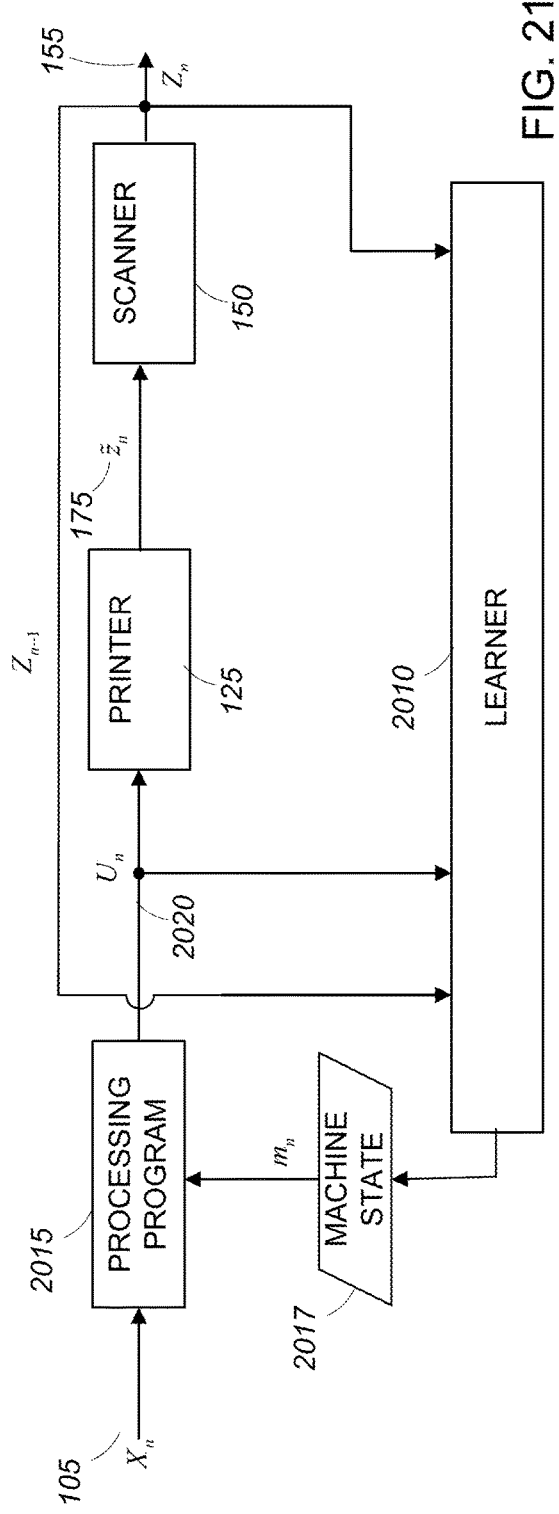
FIG. 21 is another representation of the third configuration of the system of FIG. 1 that uses estimated machine state to generate fabrication plans.

Referring to FIGS. 20 and 21, a printing process estimates a machine state and uses the estimated machine state in a processing program to develop a fabrication plan. In particular, the printing process includes a learner module 2010 that receives scans 155 of an object before and after each printing pass (i.e., $Z_{n-1}$ and $Z_n$) as well as a fabrication plan $U_n$ 2020 associated with each printing pass. The learner module 2010 estimates the machine state, $m_n$ from those inputs and provides the estimated machine state to a processing program 2015.

When an object specification $X_n$ 105 is provided to the processing program 2015, the processing program determines a fabrication plan 2020 for the object specification 105 that accounts for the machine state 2017. That fabrication plan 2020 is provided to the printer 125 and causes the printer 125 to print a fabricated object 175 according to the fabrication plan 2020. The fabricated object 175 is scanned by a scanner 150 and the process repeats.

With the machine state model incorporated into the printing process as in FIGS. 20 and 21, the processing program can better utilize the printer hardware and make adjustments to fabrication plans accordingly. For example, a processing program that incorporates a machine state can distribute nozzles with different jetting volumes, avoid using poorly jetting nozzles, and compensate for inaccuracy of motion system. If a component is performing worse than what the processing program can handle, the processing program can bring the issue to the attention of a machine operator.

In general, a machine state can be evaluated using a fixed procedure or a machine learning model. One way to estimate the machine state is to acquire two consecutive scans before and after printing a layer, as is described above. At each point of the print layer, an increase in height of the printed part is computed. The increase in height can be converted to increase in volume by multiplying by the xy printing resolution. The fabrication plan contains information to identify the nozzle that jetted over that point. The procedure can associate the nozzle to a jetting volume. Since each nozzle usually jets over many points of a layer, the procedure can improve estimation accuracy by averaging the volume over all points jetted by that nozzle. Using a machine learning model may further improve the accuracy by taking into account material behavior, such as droplet flattening, coalescing, and flowing over sloped surface.

Figure 22:
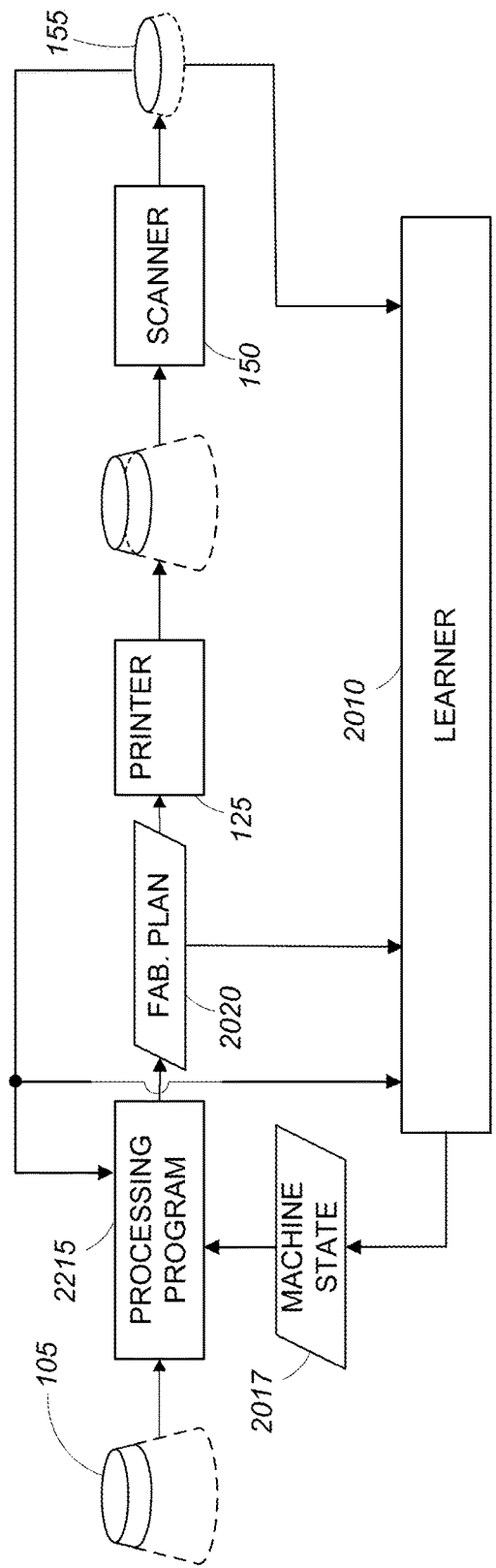
FIG. 22 is a fourth configuration of the system of FIG. 1 that uses estimated machine state and feedback to generate fabrication plans.
Figure 23:
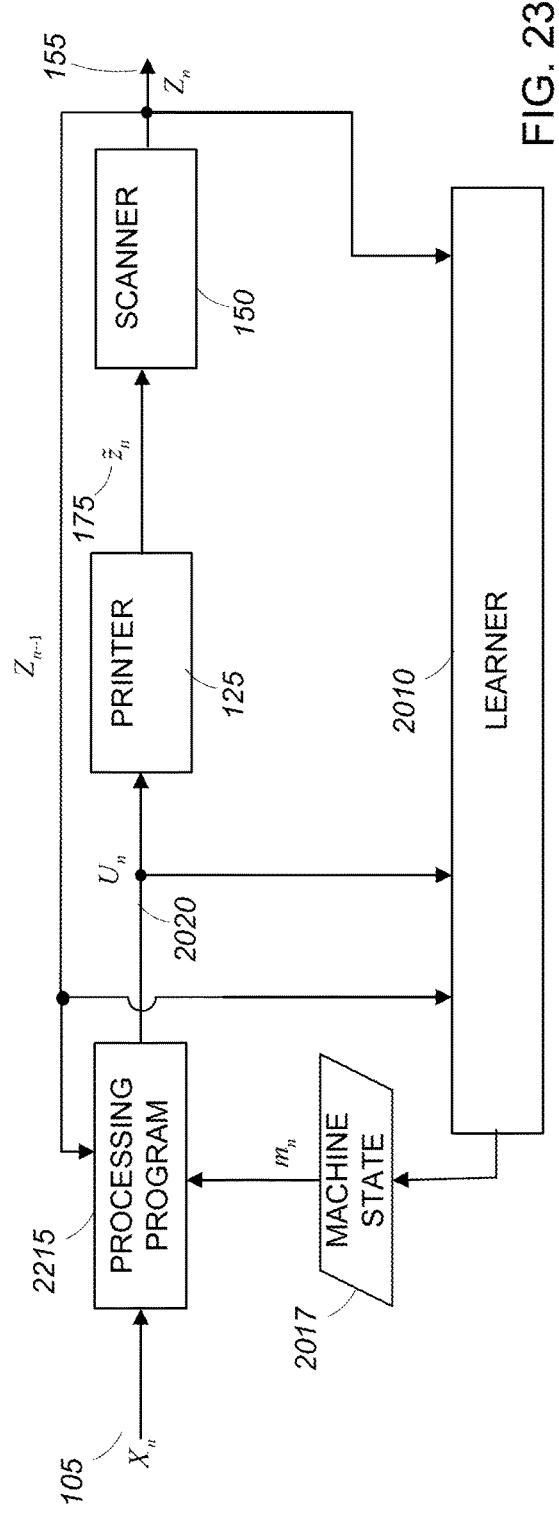
FIG. 23 is another representation of the fourth configuration of the system of FIG. 1 that uses estimated machine state and feedback to generate fabrication plans.

Referring to FIGS. 22 and 23, the printing process described above for FIGS. 21 and 22 is augmented a feedback loop that provides scans 155 to the processing program 2215. The machine state is estimated continuously with the feedback loop control. The processing program 2215 checks for any defects in the scans 155 of partial 3D prints and incorporates the machine state to plan the next layers. For example, if an area of the partial 3D print is lower than the expected height, the processing program can assign over-jetting nozzles to the area for the next few layers.

Figure 24:
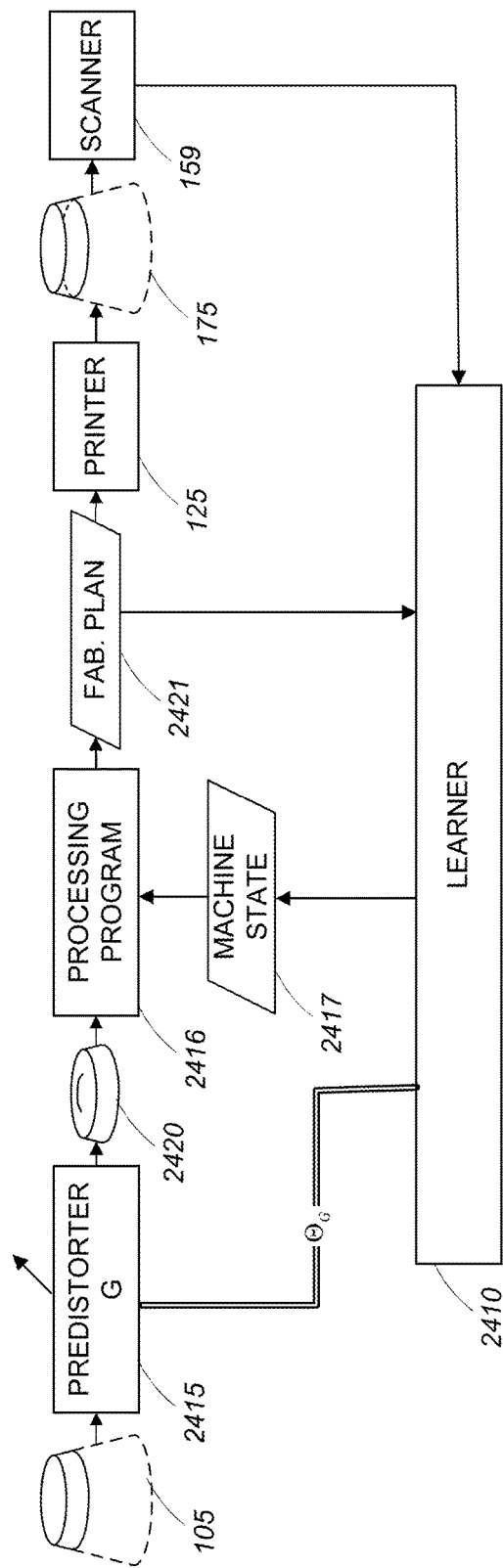
FIG. 24 is a fifth configuration of the system of FIG. 1 that uses estimated machine state and machine learning to generate fabrication plans.

Referring to FIG. 24, in some examples, the printing process includes the predistorter G 2415 (e.g., predistorter of FIG. 2) the and a processing program 2416 configured to determine a fabrication plan 2421 according to an estimated machine state 2417.

In particular, the predistorter G, configured using parameters $\Theta_G$ receives an input object specification 105 and processes the object specification to generate a modified object specification 2420. The modified object specification 2420 and the machine state 2417 are provided to the processing program 2416 which generates the fabrication plan 2421 for fabricating the modified object specification 2420 using the printer 125.

The fabrication plan 2421 is provided to the printer 125 and the printer generates a fabricated object/part 175. The fabricated object/part 175 is scanned by the scanner 150. The scan 155 and other data from the print process (omitted for the sake of simplicity) are provided to the a learner module 2410 which updates the machine state 2417 and the parameters $\Theta_G$ of predistorter G 2415 prior to the next printing pass.

In some examples, using the machine learning model in conjunction with machine state model reduces difference sources of error. For example, the machine learning model reduces material-specific systematic errors while the machine state model adds information about the condition of the printing hardware to reduce printer-specific errors.

Figure 25:
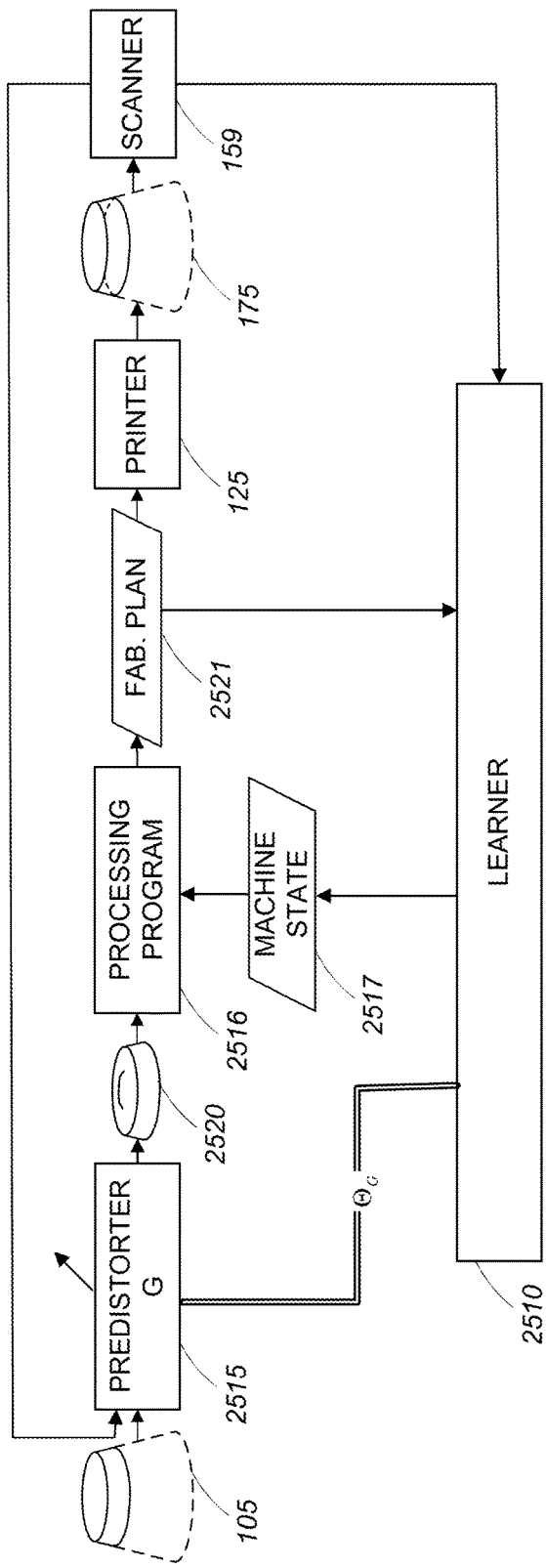
FIG. 25 is another representation of the fifth configuration of the system of FIG. 1 that uses estimated machine state and machine learning to generate fabrication plans.

Referring to FIG. 25, in some examples, the printing process includes the predistorter $G_{FL}$ 2515 (e.g., the predistorter of FIG. 11), a processing program 2516 configured to determine a fabrication plan 2521 according to an estimated machine state 2517, and a feedback loop.

In particular, the predistorter $G_{FL}$, configured using parameters $\Theta_G$ receives an input object specification 105 and a scan 155 of the printed object after the last printing pass (via a feedback path) and processes the object specification 105 and the scan 155 to generate a modified object specification 2520. The modified object specification 2520 and the machine state 2517 are provided to the processing program 2516 which generates the fabrication plan 2521 for fabricating the modified object specification 2420 using the printer 125.

The fabrication plan 2521 is provided to the printer 125 and the printer generates a fabricated object/part 175. The fabricated object/part 175 is scanned by the scanner 150. The scan 155 and other data from the print process (omitted for the sake of simplicity) are provided to the a learner module 2510 which updates the machine state 2517 and the parameters $\Theta_G$ of predistorter $G_{FL}$ 2515 prior to the next printing pass. The scan 155 is also provided to via the feedback path to the predistorter $G_{FL}$ 2515 for the next printing pass.

In some examples, the learner module 2510 updates the machine state 2517 and the parameters $\Theta_G$ of predistorter $G_{FL}$ 2515 for each printing pass. In other examples, the machine state 2517 and the parameters $\Theta_G$ of predistorter $G_{FL}$ 2515 are updated every n printing passes.

5 Additive Manufacturing Using a Machine Learning Model with a Machine State Input

5.1 Runtime Operation

Figure 26:
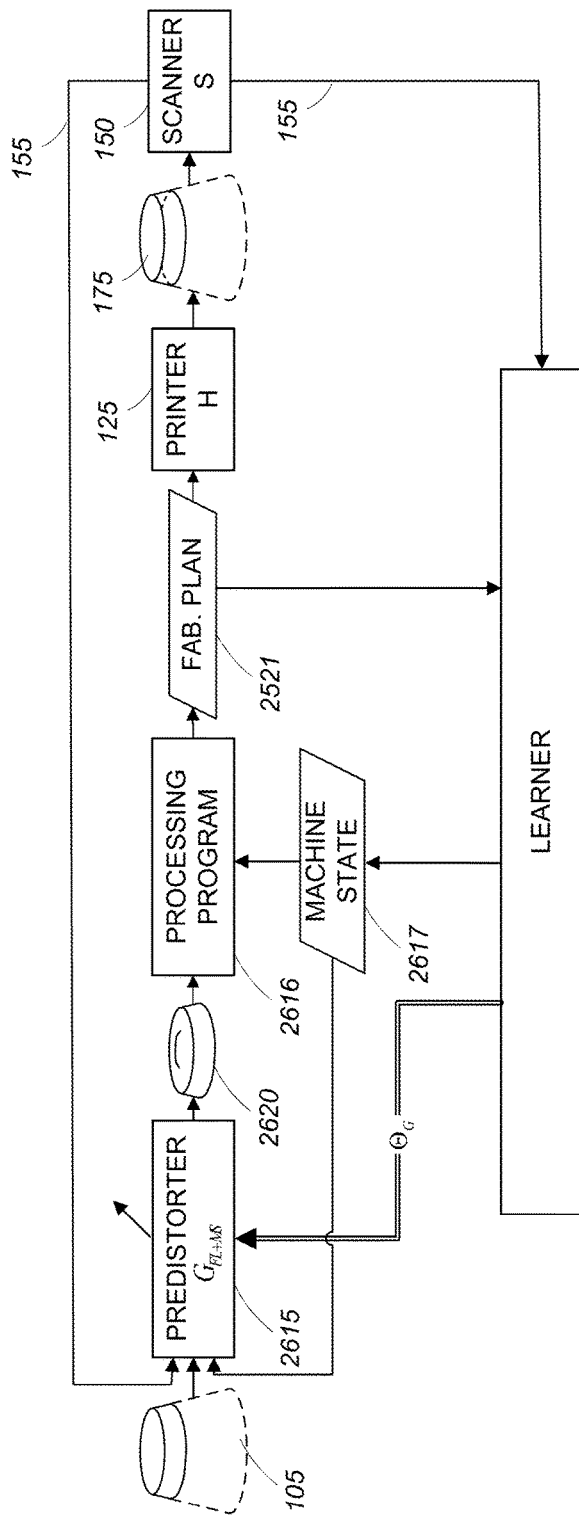
FIG. 26 is a sixth configuration of the system of FIG. 1 that uses machine learning, feedback, and machine state to generate fabrication plans.
Figure 27:
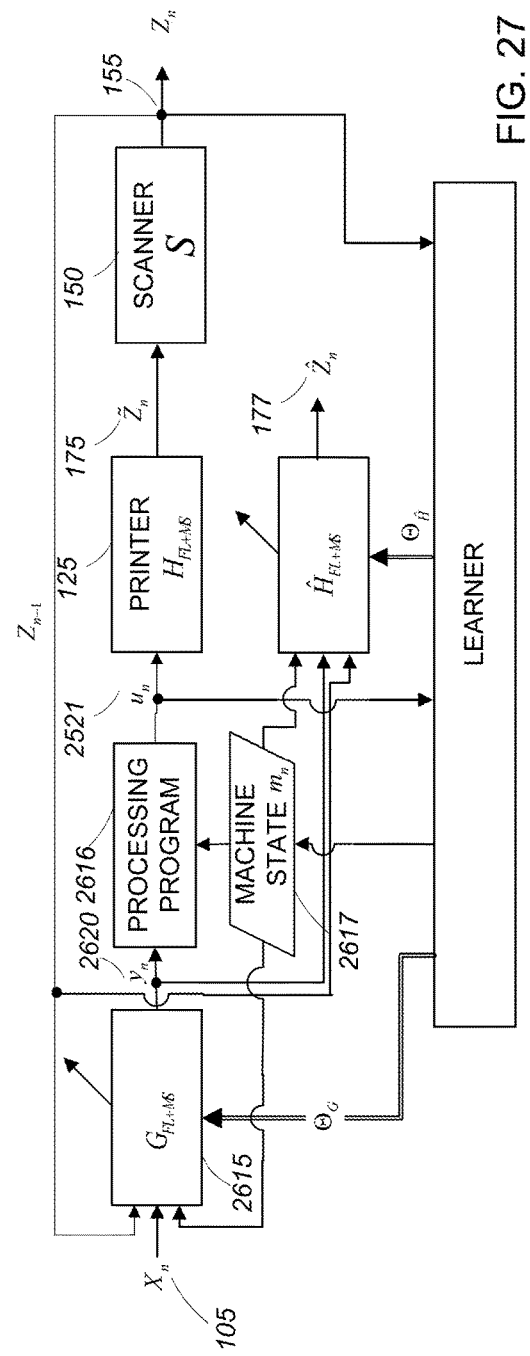
FIG. 27 is another representation of the sixth configuration of the system of FIG. 1 that uses machine learning, feedback, and machine state to generate fabrication plans.

Referring to FIGS. 26 and 27, another exemplary approach of an additive manufacturing process uses a machine learning based predistorter that is configured to receive scans of objects fabricated in previous printing passes and machine state as additional inputs.

In the approach shown in FIGS. 26 and 27, an input specification ($X_n$) 105 of the object to be fabricated, a scan ($Z_{n-1}$) 155 of the object to be fabricated in the previous printing pass, and an estimate of the current machine state ($m_n$) 2617 are provided to a predistorter $G_{FL+MS}$ 2615 that is configured according to parameters $\Theta_G$. The predistorter $G_{FL+MS}$ 2615 processes the input specification 105, the scan 155, and the machine state 2617 to generate a corresponding modified input specification ($y_n$) 120. The modified input specification 120 is provided to a processing program 2616 along with the machine state ($m_n$) 2617. The processing program 2616 processes the modified input specification 120 according to the machine state 2616 to generate a fabrication plan ($u_n$) 2521. The fabrication plan 2521 is provided to a printer H 125 which prints a fabricated part ($\hat{Z}_n$) 175 according to the fabrication plan 2521.

The fabricated part 175 is scanned by scanner (e.g., an optical scanner) 150 which generates a scan ($Z_n$) 155 of the newly fabricated part 175. The new scan 155 is fed back to the predistorter $G_{FL}$ 2615 for use in the next printing pass.

FIG. 27 also shows that the modified input specifications 120, the scans 155, and the machine state 2617 may also be provided to a simulation of the printer $\hat{H}_{FL+MS}$ 2616, which processes the modified input specifications 120, the scans 155, and the machine state 2617 to generate predicted fabricated parts $\hat{Z}_n$ 177. The simulator $\hat{H}_{FL+MS}$ 2616 is used for training purposes, as is described in greater detail below.

Finally, a learner 2610 receives the scans 155, the machine state 2617, the modified input specification 2620 and possibly other data from the printing process for training the predistorter $G_{FL+MS}$ 2615, the simulator $\hat{H}_{FL+MS}$ 2616, and for estimating the machine state 2617.

5.2 Training

In some examples, to train the predistorter $G_{FL+MS}$ 2615, the simulator $\hat{H}_{FL+MS}$ 2616, and to estimate the machine state 2617, training data is collected from the printing of previous objects and the collected training data is used to determine predistorter parameters $\Theta_G$ for the predistorter $G_{FL+MS}$ 2615, the simulation parameters $\Theta_{\hat{H}}$ for the simulator $\hat{H}_{FL+MS}$ 2616, and the estimate of the machine state 2617.

For example, training data including a number of quadruples ($y_n$, $Z_n$, $m_n$) of modified input specifications $y_n$, current scans $Z_n$, previous scans $Z_{n-1}$, and the machine state $m_n$ are stored during previous printing passes. That training data is then processed in a batch or online training procedure to determine predistorter parameters $\Theta_G$ for the predistorter $G_{FL+MS}$ 2615, the simulation parameters $\Theta_{\hat{H}}$ for the simulator $H_{FL+MS}$ 2616, and the estimate of the machine state 2617.

Figure 28:
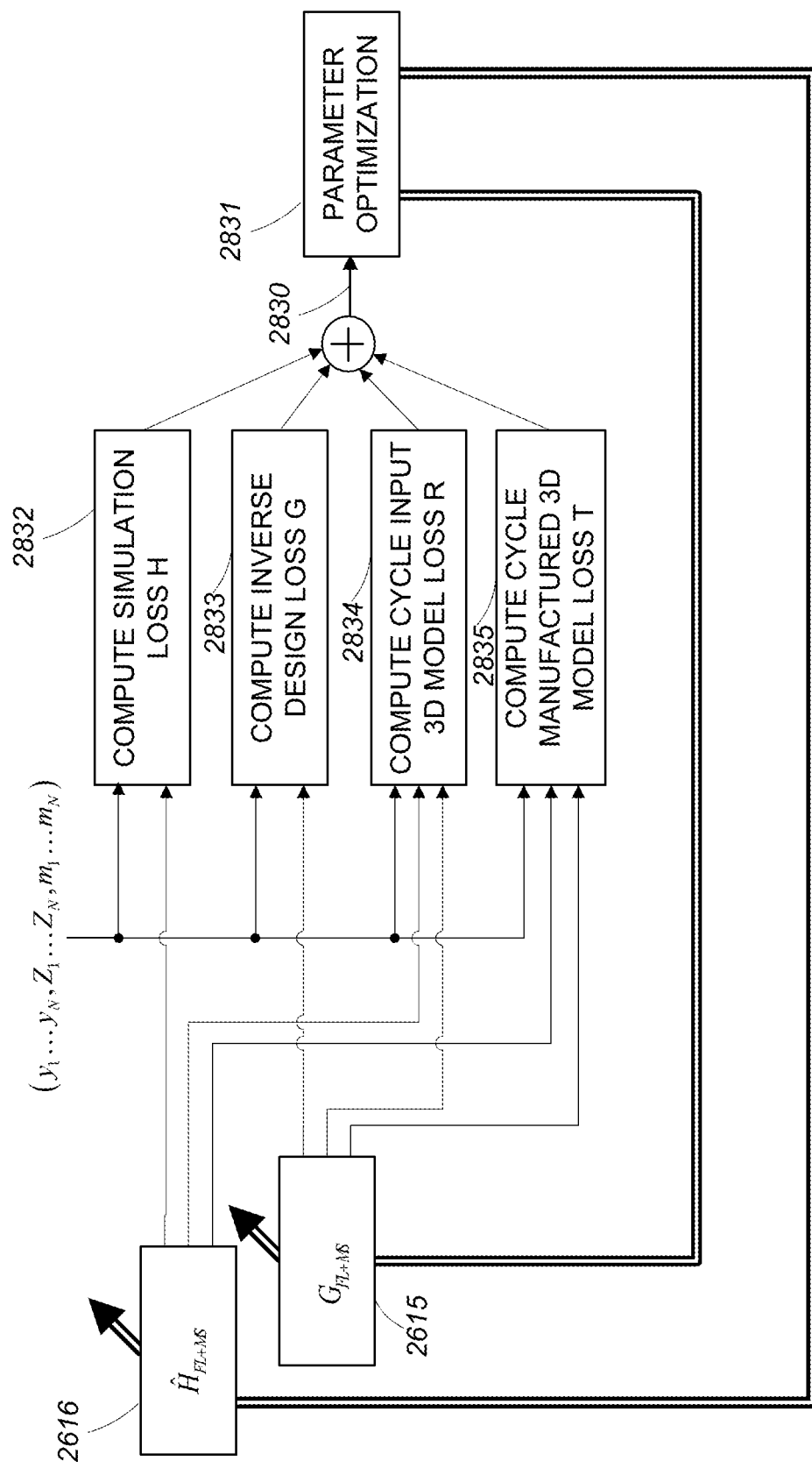
FIG. 28 is a training system for training the sixth configuration.

Referring to FIG. 28, in one example of such a training procedure, a combined loss 2830 is determined as a sum (or weighted sum) of a simulation loss, an inverse design loss, a cycle input 3D model loss, and a cycle manufactured 3D model loss. That combined loss is provided to parameter optimization module 2831 that determines the updated predistorter parameters $\Theta_G$ and the updated simulation parameters $\Theta_{\hat{H}}$.

In some examples, the parameter optimization module 2831 determines the parameters $\Theta_G$ and $\Theta_{\hat{H}}$ by using an optimization algorithm to iteratively update the parameters $\Theta_G$ and $\Theta_{\hat{H}}$ until some stopping criteria (e.g., number of iterations, convergence). One common way of updating model parameters involves computing/estimating gradients of the combined loss function with respect to the model parameters. For example, backpropagation algorithm for an artificial uses these gradient estimates. Of course, other parameter update schemes can be used.

5.2.1 Simulation Loss Computation

Figure 29:
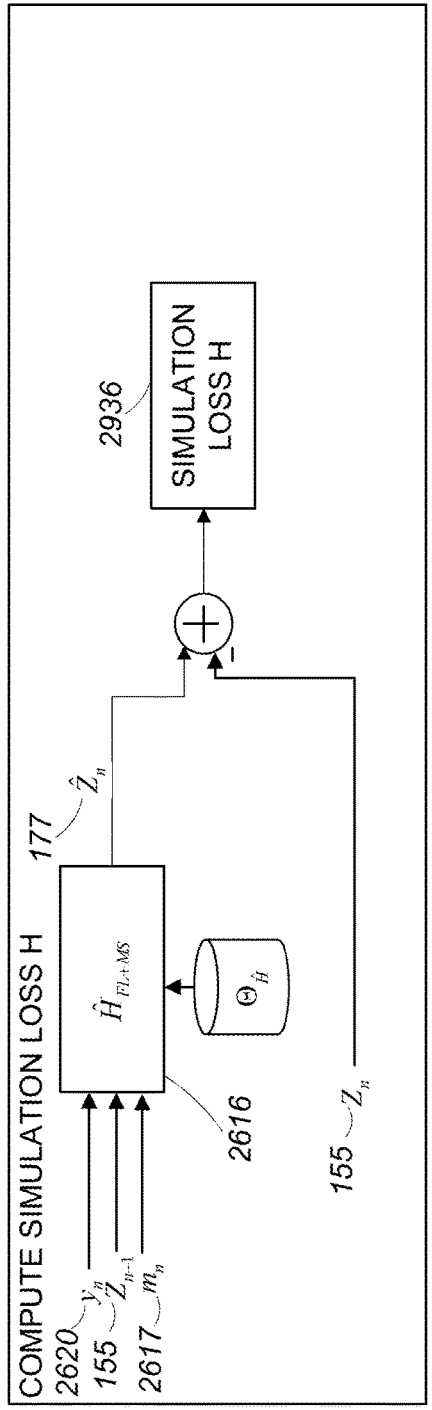
FIG. 29 is a simulation loss computation module.

Referring to FIG. 29, to compute the simulation loss, a compute simulation loss module 2832 (see FIG. 28) receives training data including quadruples ($y_n$, $Z_n$, $Z_{n-1}$, $m_n$) of modified input specifications $y_n$, current scans $Z_n$, previous scans $Z_{n-1}$, and the machine state $m_n$. The modified input specifications $y_n$ 2620, the previous scans $Z_{n-1}$ 155, and the machine state $m_n$ 2617 are provided to the simulator $\hat{H}_{FL+MS}$ 2616 as input and the simulator $\hat{H}_{FL+MS}$ 2616 generates corresponding predicted fabricated parts $\hat{Z}_n$ 177. For each training quadruple, the simulation loss 2936 is computed as a difference between the current scan $Z_n$ 155 and the predicted fabricated part $\hat{Z}_n$ 177.

5.2.2 Inverse Design Loss Computation

Figure 30:
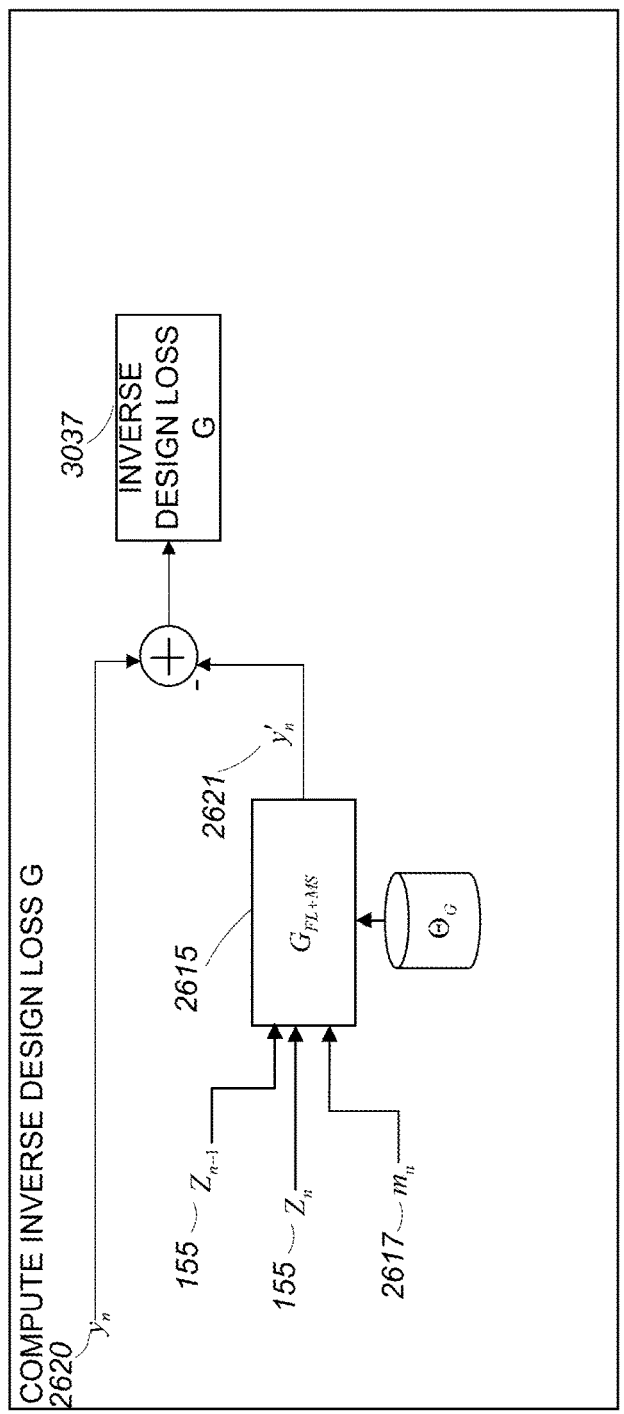
FIG. 30 is an inverse design loss computation module.

Referring to FIG. 30, to compute the inverse design loss, a compute inverse design loss module 2833 (see FIG. 28) receives training data including quadruples ($y_n$, $Z_n$, $Z_{n-1}$, $m_n$) of modified input specifications $y_n$, current scans $Z_n$, previous scans $Z_{n-1}$, and the machine state $m_n$. The current and previous scans $Z_n$, $Z_{n-1}$ 155 are provided to the predistorter $G_{FL+MS}$ 2615 as input, and the predistorter $G_{FL+MS}$ 2615 generates corresponding predicted modified input specification $y'_n$ 2621. For each training quadruple, the inverse design loss 3037 is computed as a difference between the modified input specification $y_n$ 2620 and the predicted modified input specification $y'_n$ 2621.

5.2.3 Cycle Input 3D Model Loss Computation

Figure 31:
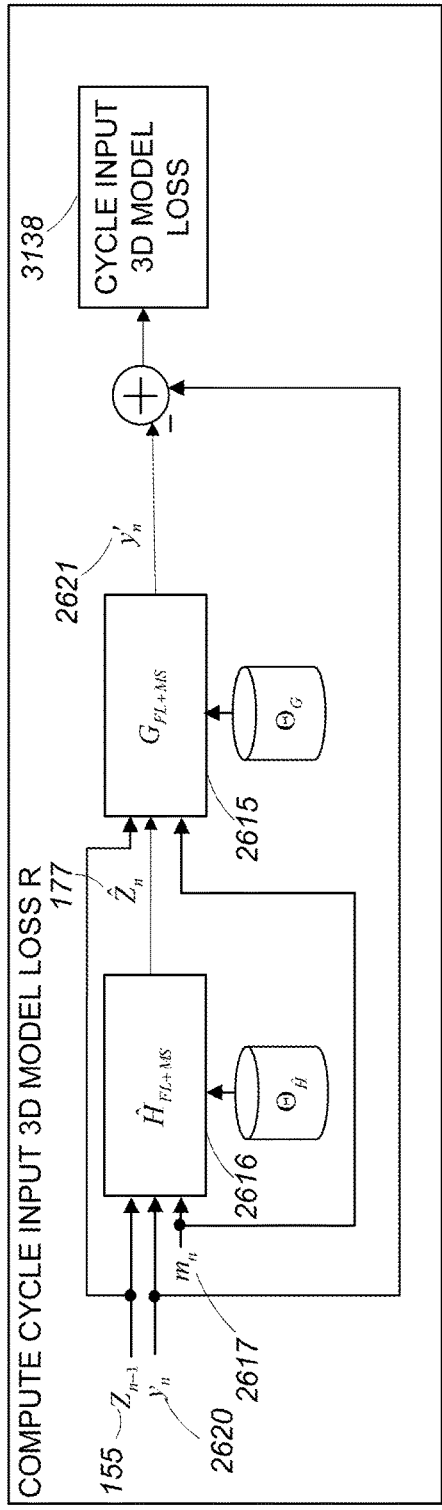
FIG. 31 is a cycle input 3D model loss computation module

Referring to FIG. 31, to compute the cycle input 3D model loss, a compute cycle input 3D model loss module 2834 (see FIG. 28) receives training data including triples ($y_n$, $Z_{n-i}$, $m_n$) of modified input specifications $y_n$, previous scans $Z_{n-1}$, and the machine state $m_n$. For each training triple, the modified input specification $y_n$, the previous scan $Z_{n-1}$, and the machine state $m_n$ are provided as input to the simulator $\hat{H}_{FL+MS}$ 2616, which uses them to generate a corresponding predicted fabricated part $\hat{Z}_n$ 177. The predicted fabricated part 177, the previous scan $Z_{n-1}$, and the machine state $m_n$ are provided to the predistorter $G_{FL+MS}$ 2615 which uses them to generate a predicted modified input specification $y'_n$ 2621. The cycle input 3D model loss 3138 is computed as a difference between the modified input specification $y_n$ 120 and the predicted modified input specification $y'_n$ 2621.

5.2.4 Cycle Manufactured 3D Model Loss Computation

Figure 32:
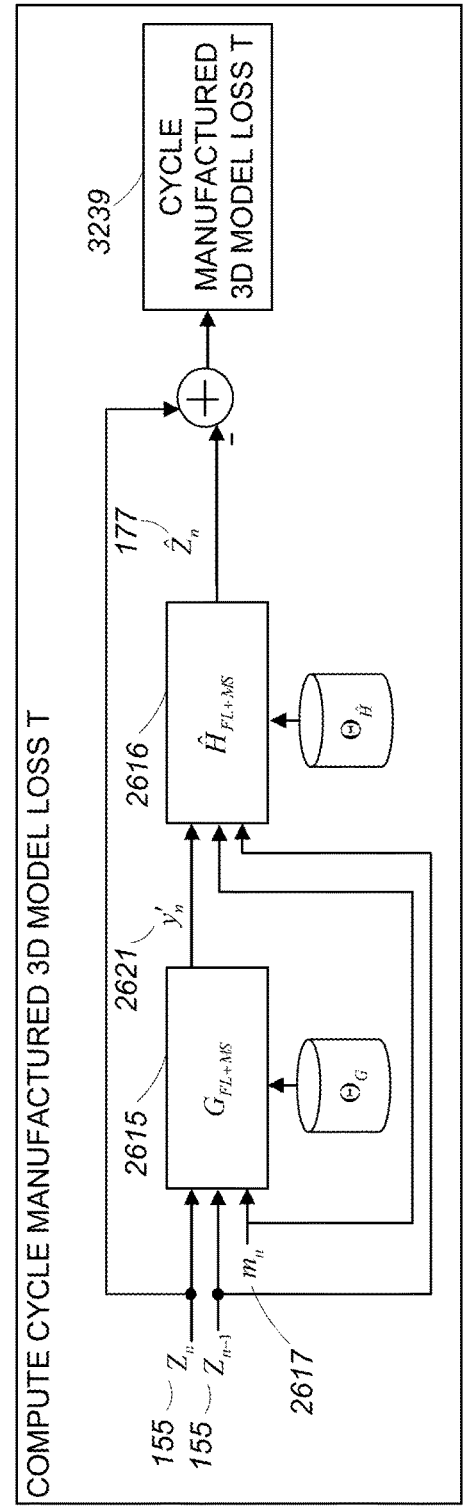
FIG. 32 is a cycle manufactured 3D model loss computation module.

Referring to FIG. 32, to compute the cycle manufactured 3D model loss, a compute cycle manufactured 3D model loss module 2835 (see FIG. 28) receives training data including triples ($Z_n$, $Z_{n-1}$, $m_n$) of the current scan $Z_n$, the previous scan $Z_{n-1}$, and the machine state $m_n$ as input. For each training data triple, the current scan $Z_n$ the previous scan $Z_{n-1}$, and the machine state $m_n$ are provided to the predistorter $G_{FL+MS}$ 2615 which uses them to generate a predicted modified input specification $y'_n$ 2621. The predicted modified input specification $y'_n$ 2621, the previous scan $Z_{n-1}$, and the machine state $m_n$ are provided to the simulator $\hat{H}_{FL+MS}$ 2616, which uses them to generate a corresponding predicted fabricated part $\hat{Z}_n$ 177. The cycle manufactured 3D model loss 3239 is computed as a difference between the current scan $Z_n$ 155 and the predicted fabricated part $\hat{Z}_n$ 177.

Figure 33:
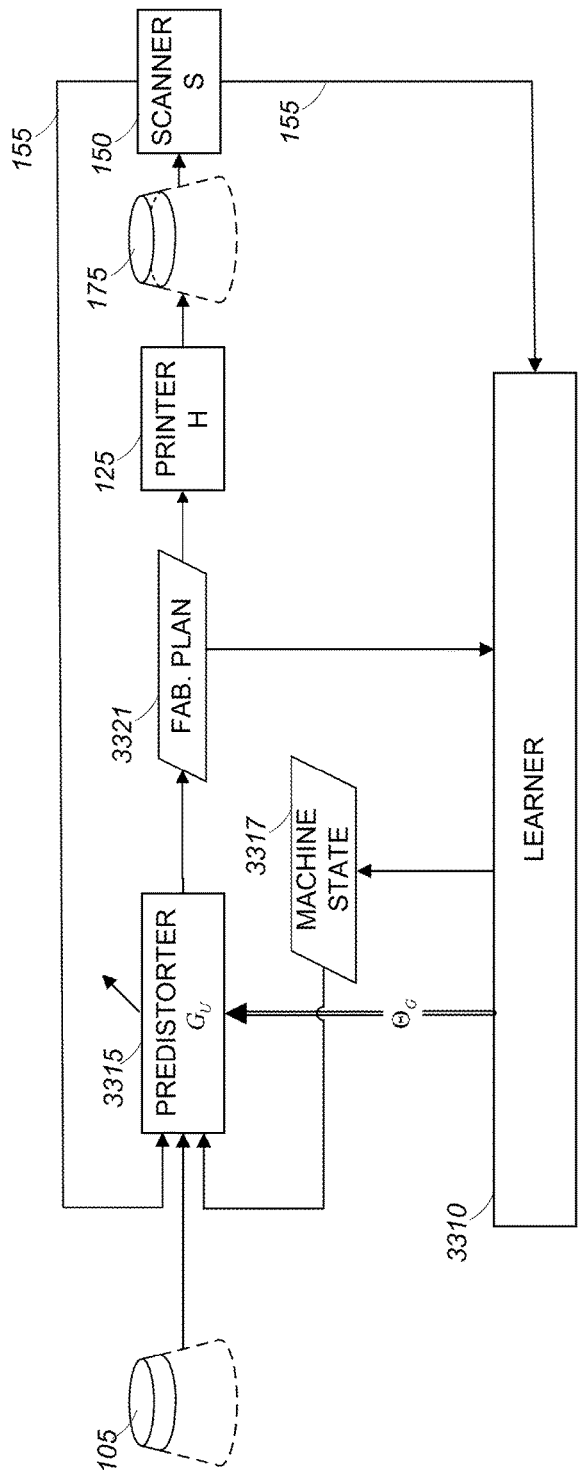
FIG. 33 is a seventh configuration of the system of FIG. 1 that uses machine learning, feedback, and machine state to generate fabrication plans.
Figure 34:
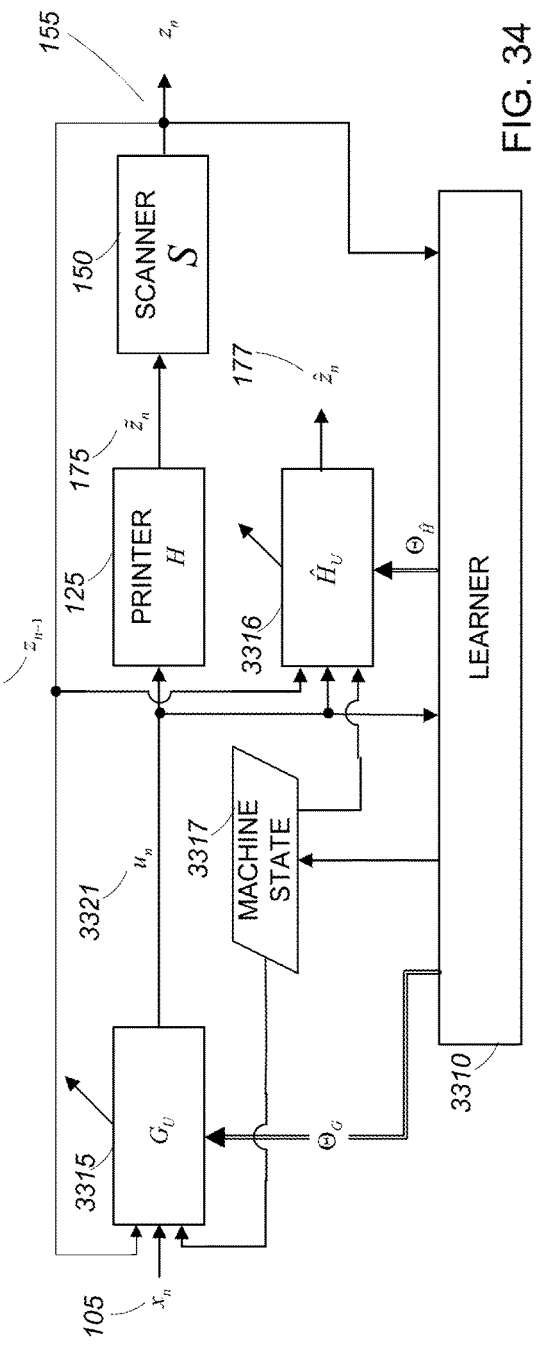
FIG. 34 is another representation of the seventh configuration of the system of FIG. 1 that uses machine learning, feedback, and machine state to generate fabrication plans.

6 ADDITIVE MANUFACTURING USING A MACHINE LEARNING MODEL WITH FABRICATION PLAN GENERATION 6.1 Runtime Operation Referring to FIGS. 33 and 34, another exemplary approach of an additive manufacturing process uses a machine learning based predistorter that is configured to directly generate fabrication plans from an input specification, the current machine state, and a scan of the previously printed layer.

In the approach shown in FIGS. 33 and 34, an input specification ($X_n$) 105 of the object to be fabricated, a scan ($Z_{n-1}$) 155 of the object as fabricated in the previous printing pass, and an estimate of the current machine state ($m_n$) 3317 are provided to a predistorter $G_U$ 3315 that is configured according to parameters $\Theta_G$. The predistorter $G_U$ 3315 processes the input specification 105, the scan 155, and the machine state 3317 to generate a fabrication plan ($u_n$) 3321. The fabrication plan 3321 is provided to the printer H 125 which prints a fabricated part ($\tilde{Z}_n$) 175 according to the fabrication plan 3321.

The fabricated part 175 is scanned by scanner (e.g., an optical scanner) 150 which generates a scan ($Z_n$) 155 of the newly fabricated part 175. The new scan 155 is fed back to the predistorter $G_U$ 3315 for use in the next printing pass.

FIG. 34 also shows that the fabrication plan 3321, the scans 155, and the machine state 3317 may also be provided to a simulation of the printer $\hat{H}_U$ 3316, which processes the fabrication plan 3321, the scans 155, and the machine state 3317 to generate a predicted fabricated part $\hat{Z}_n$ 177. The simulator $\hat{H}_U$ 3316 is used for training purposes, as is described in greater detail below.

Finally, a learner 3310 receives the scans 155, the machine state 3317, the fabrication plan 3321 and possibly other data from the printing process for training the predistorter $G_U$ 3315, the simulator $\hat{H}_U$ 3316, and for estimating the machine state 3317.

6.2 Training

In some examples, to train the predistorter $G_U$ 3315, the simulator $\hat{H}_U$ 3316, and to estimate the machine state 3317, training data is collected from the printing of previous objects and the collected training data is used to determine predistorter parameters $\Theta_G$ for the predistorter $G_U$ 3315, the simulation parameters $\Theta_{\hat{H}}$ for the simulator $\hat{H}_U$ 3316, and the estimate of the machine state 3317.

For example, training data including a number of quadruples ($u_n$, $Z_n$, $Z_{n-1}$, $m_n$) of fabrication plans $u_n$, current scans $Z_n$, previous scans $Z_{n-1}$, and the machine state $m_n$ are stored during previous printing passes. That training data and possibly other data is then processed in a batch or online training procedure to determine predistorter parameters $\Theta_G$ for the predistorter $G_U$ 3315, the simulation parameters $\Theta_{\hat{H}}$ for the simulator $\hat{H}_U$ 3316, and the estimate of the machine state 3317.

Figure 35:
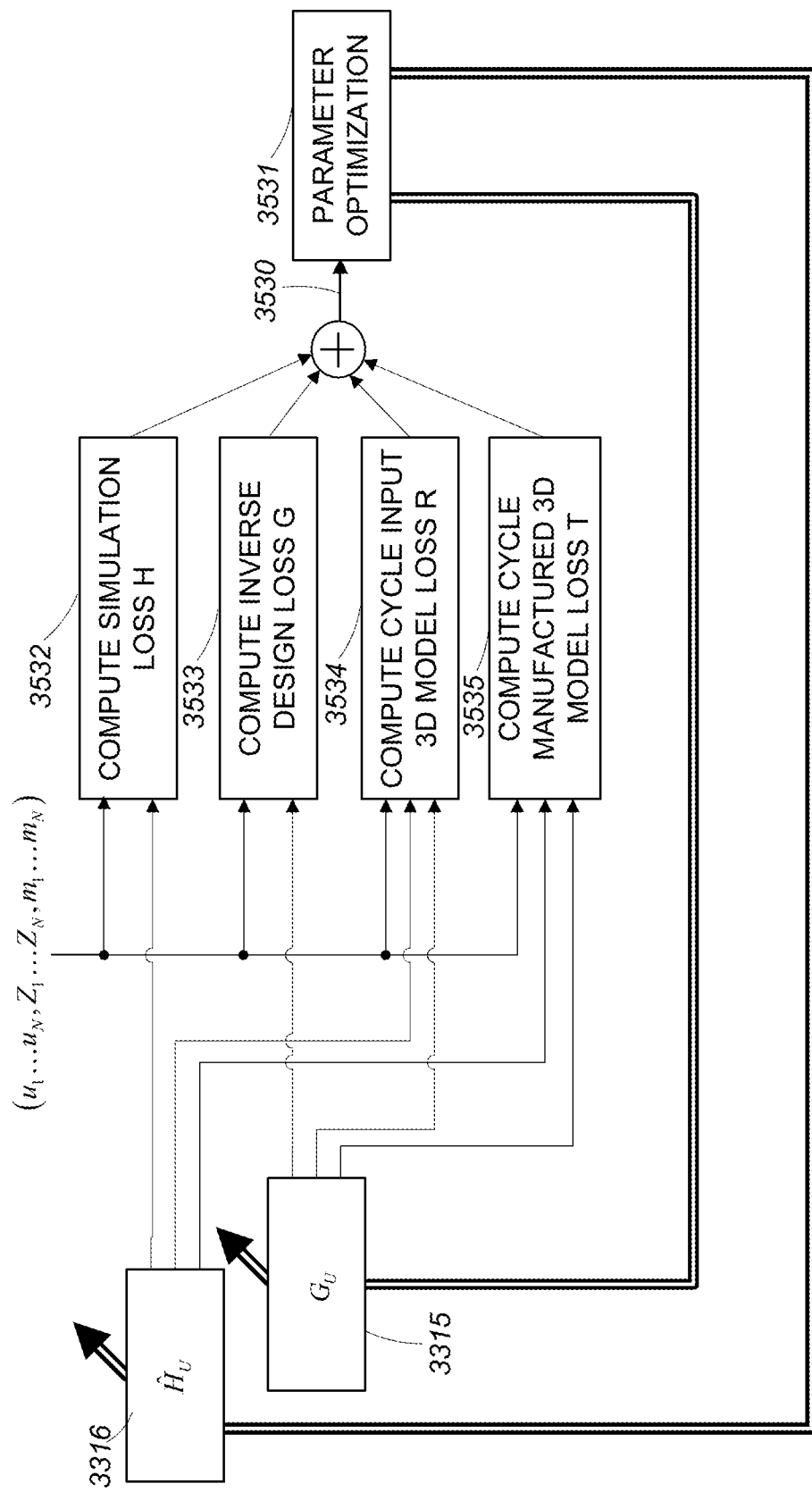
FIG. 35 is a training system for training the seventh configuration.

Referring to FIG. 35, in one example of such a training procedure, a combined loss 3530 is determined as a sum (or weighted sum) of a simulation loss, an inverse design loss, a cycle input 3D model loss, and a cycle manufactured 3D model loss. That combined loss is provided to parameter optimization module 3531 that determines the updated predistorter parameters $\Theta_G$ and the updated simulation parameters $\Theta_{\hat{H}}$.

In some examples, the parameter optimization module 3531 determines the parameters $\Theta_G$ and $\Theta_{\hat{H}}$ by using an optimization algorithm to iteratively update the parameters $\Theta_G$ and $\Theta_{\hat{H}}$ until some stopping criteria (e.g., number of iterations, convergence). One common way of updating model parameters involves computing/estimating gradients of the combined loss function with respect to the model parameters. For example, backpropagation algorithm for an artificial uses these gradient estimates. Of course, other parameter update schemes can be used.

6.2.1 Simulation Loss Computation

Figure 36:
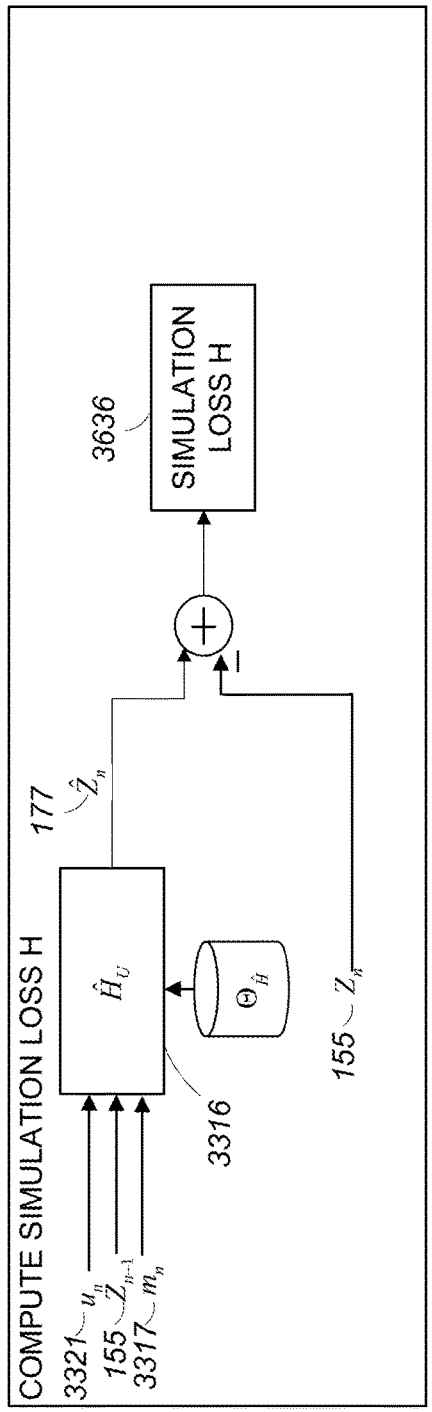
FIG. 36 is a simulation loss computation module.

Referring to FIG. 36, to compute the simulation loss, a compute simulation loss module 3532 (see FIG. 35) receives training data including quadruples ($u_n$, $Z_n$, $Z_{n-1}$, $m_n$) of fabrication plans $u_n$, current scans $Z_n$, previous scans $Z_{n-1}$, and the machine state $m_n$. The fabrication plan $u_n$ 3321. the previous scans $Z_{n-1}$ 155, and the machine state $m_n$ 3317 are provided to the simulator $\hat{H}_U$ 3316 as input and the simulator $\hat{H}_U$ 3316 generates corresponding predicted fabricated parts $\hat{Z}_n$ 177. For each training quadruple, the simulation loss 3636 is computed as a difference between the current scan $Z_n$ 155 and the predicted fabricated part $\hat{Z}_n$ 177.

6.2.2 Inverse Design Loss Computation

Figure 37:
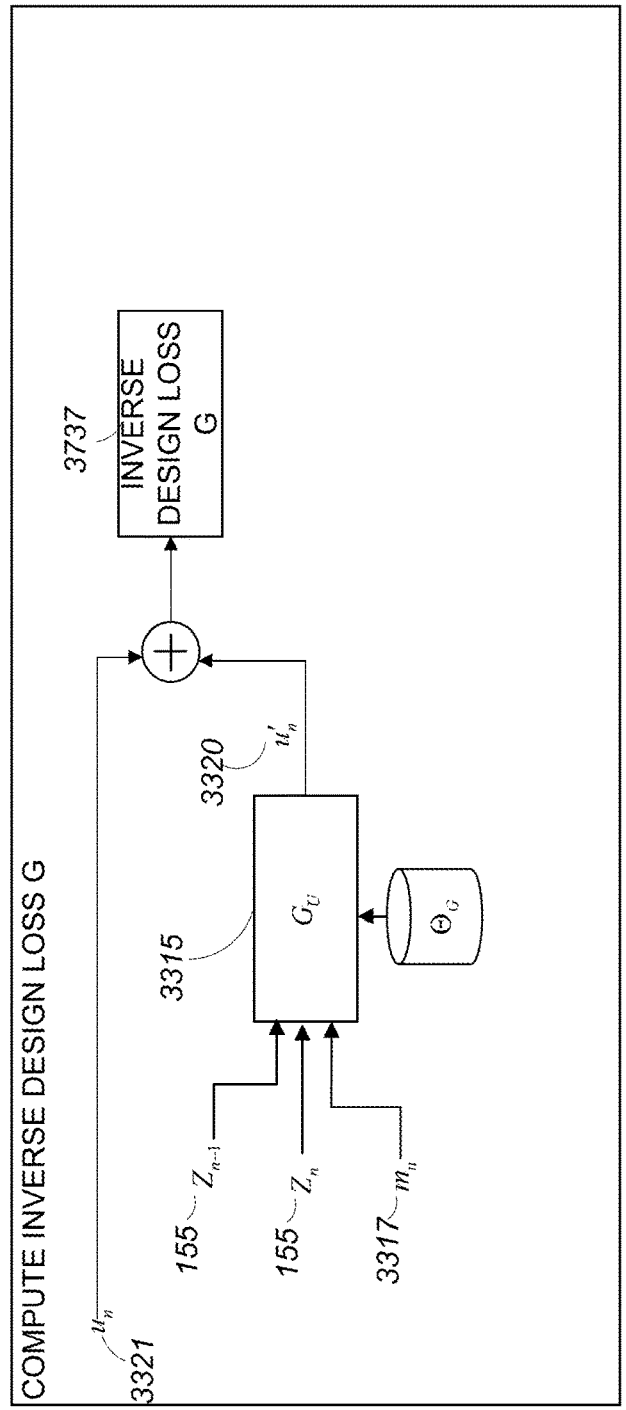
FIG. 37 is an inverse design loss computation module.

Referring to FIG. 37, to compute the inverse design loss, a compute inverse design loss module 3533 (see FIG. 35) receives training data including quadruples ($u_n$, $Z_n$, $Z_{n-1}$, $m_n$) of fabrication plans $u_n$, current scans $Z_n$, previous scans $Z_{n-1}$, and the machine state $m_n$. The current and previous scans $Z_n$, $Z_{n-1}$ 155 are provided to the predistorter $G_U$ 3315 as input, and the predistorter $G_U$ 3315 generates corresponding predicted fabrication plan $u'_n$ 3320. For each training quadruple, the inverse design loss 3737 is computed as a difference between the fabrication plan $u_n$ 3321 and the predicted fabrication plan $y'_n$ 3320.

6.2.3 Cycle Input 3D Model Loss Computation

Figure 38:
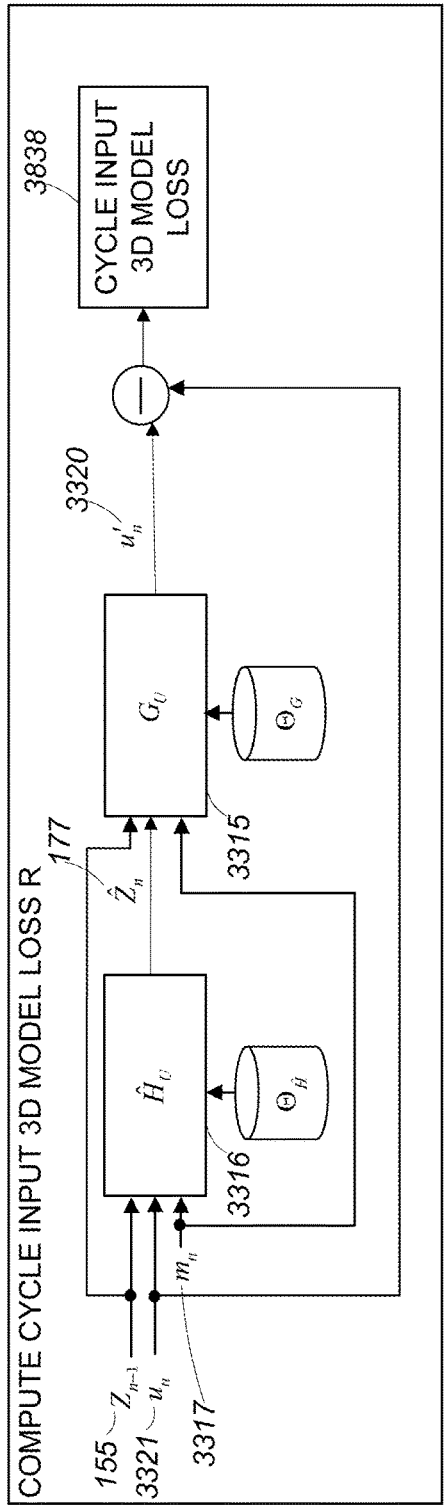
FIG. 38 is a cycle input 3D model loss computation module

Referring to FIG. 38, to compute the cycle input 3D model loss, a compute cycle input 3D model loss module 3534 (see FIG. 35) receives training data including triples ($u_n$, $Z_{n-1}$, $m_n$) of fabrication plans $u_n$, previous scans $Z_{n-1}$, and the machine state $m_n$. For each training triple, the fabrication plan $u_n$, the previous scan $Z_{n-1}$, and the machine state $m_n$ are provided as input to the simulator $\hat{H}_U$ 3316, which uses them to generate a corresponding predicted fabricated part $\hat{Z}_n$ 177. The predicted fabricated part 177, the previous scan $Z_{n-1}$, and the machine state $m_n$ are provided to the predistorter $G_U$ 3315 which uses them to generate a predicted fabrication plan $u'_n$ 3320. The cycle input 3D model loss 3838 is computed as a difference between the fabrication plan $u_n$ 3321 and the predicted fabrication plan $u'_n$ 3320.

6.2.4 Cycle Manufactured 3D Model Loss Computation

Figure 39:
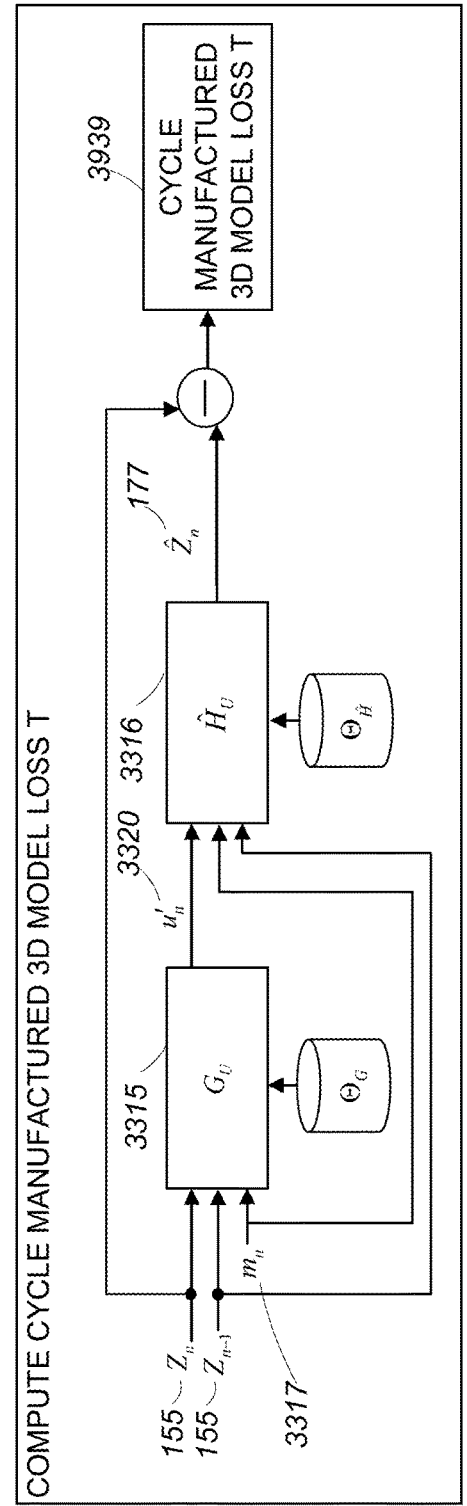
FIG. 39 is a cycle manufactured 3D model loss computation module.

Referring to FIG. 39, to compute the cycle manufactured 3D model loss, a compute cycle manufactured 3D model loss module 3535 (see FIG. 35) receives training data including triples ($Z_n$, $Z_{n-1}$, $m_n$) of the current scan $Z_n$, the previous scan $Z_{n-1}$, and the machine state $m_n$ as input. For each training data triple, the current scan $Z_n$ the previous scan $Z_{n-1}$, and the machine state $m_n$ are provided to the predistorter $G_U$ 3315 which uses them to generate a predicted fabrication plan $u'_n$ 3320. The predicted fabrication plan $u'_n$ 3320, the previous scan $Z_{n-1}$, and the machine state $m_n$ are provided to the simulator $\hat{H}_U$ 3316, which uses them to generate a corresponding predicted fabricated part $\hat{Z}_n$ 177. The cycle manufactured 3D model loss 3939 is computed as a difference between the current scan $Z_n$ 155 and the predicted fabricated part $\hat{Z}_n$ 177.

7 Additive Manufacturing Using a Machine Learning Model with Integrated Machine State Model and Fabrication Plan Generation

7.1 Runtime Operation

Figure 40:
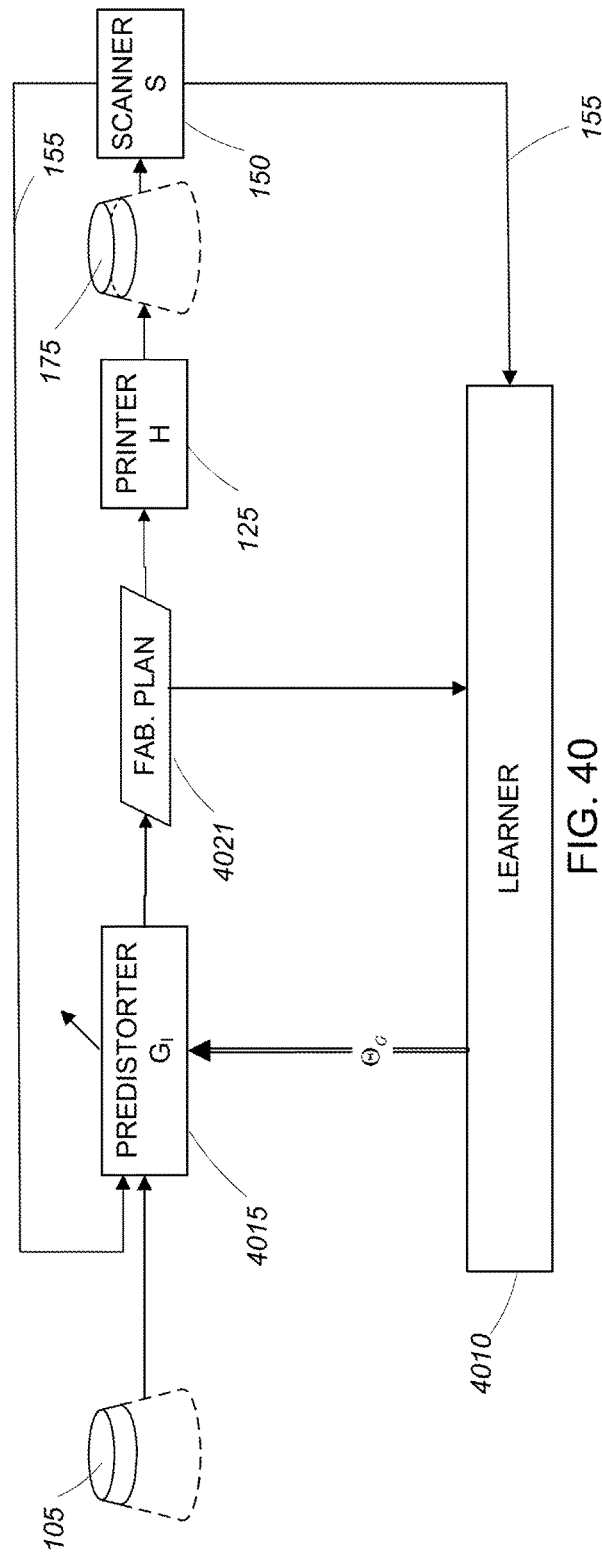
FIG. 40 is an eighth configuration of the system of FIG. 1 that includes a predistorter that incorporates machine state and uses feedback and machine learning to generate fabrication plans.
Figure 41:
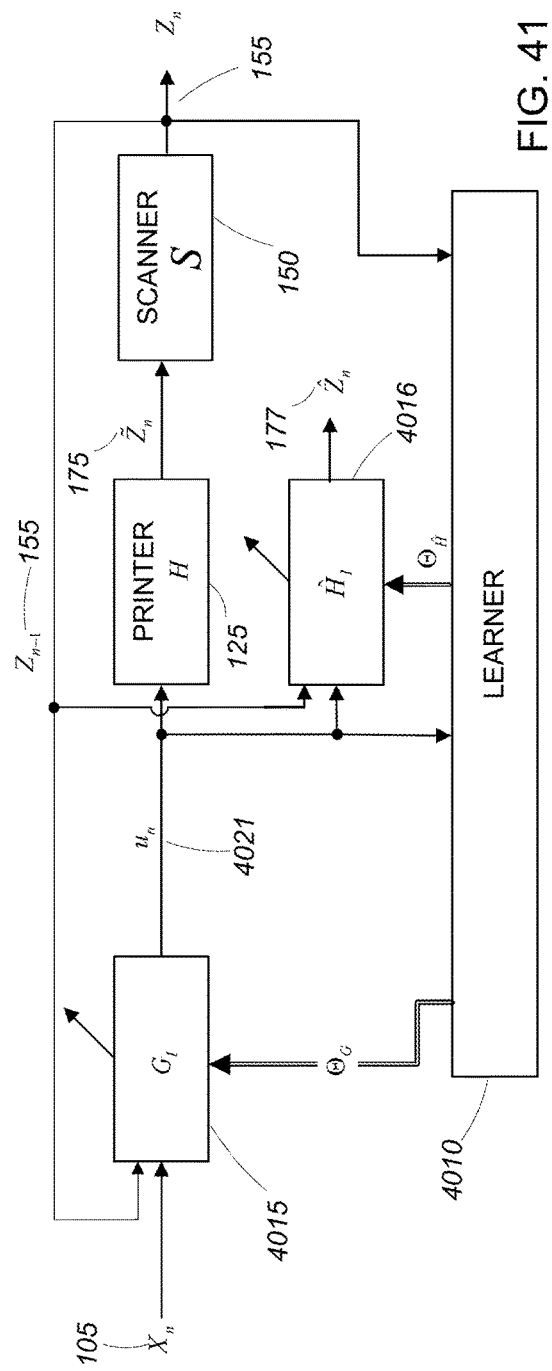
FIG. 41 is another representation of the eighth configuration of the system of FIG. 1 that includes a predistorter that incorporates machine state and uses feedback and machine learning to generate fabrication plans.

Referring to FIGS. 40 and 41, another exemplary approach of an additive manufacturing process uses a machine learning based predistorter that is configured to directly generate fabrication plans from an input specification and a scan of the previously printed layer using an integrated machine state model. In general, the predistorter automatically infers the machine state by storing information about previous 3D scans and partial fabrication plans. In some examples, the neural network architecture of the predistorter is adapted to store historical information by adding recurrent neural network structures. In some examples, the predistorter learns its own representation of the machine state based on the machine state model designed by human experts. Advantageously, the predistorter integrates substantially all aspects of the processing software in that it takes the specification and scans of manufactured part as input and directly generates fabrication plan that can be carried out by manufacturing hardware.

In the approach shown in FIGS. 40 and 41, an input specification ($X_n$) 105 of the object to be fabricated and scan ($Z_{n-1}$) 155 of the object as fabricated in the previous printing pass are provided to a predistorter $G_I$ 4015 that is configured according to parameters $\Theta_G$. The predistorter $G_I$ 4015 processes the input specification 105 and the scan 155 to generate a fabrication plan ($u_n$) 4021. The fabrication plan 4021 is provided to the printer H 125 which prints a fabricated part ($\hat{Z}_n$) 175 according to the fabrication plan 4021.

The fabricated part 175 is scanned by scanner (e.g., an optical scanner) 150 which generates a scan ($Z_n$) 155 of the newly fabricated part 175. The new scan 155 is fed back to the predistorter $G_I$ 4015 for use in the next printing pass.

FIG. 35 also shows that the fabrication plans 4021 and the scans 155 may also be provided to a simulation of the printer $\hat{H}_I$ 4016, which processes the fabrication plan 4021 and the scans 155 to generate a predicted fabricated part $\hat{Z}_n$ 177. The simulator $\hat{H}_I$ 4016 is used for training purposes, as is described in greater detail below.

Finally, a learner 4010 receives the scans 155 and the fabrication plan 4021 and possibly other data from the printing process for training the predistorter $G_I$ 4015 and the simulator $\hat{H}_I$ 4016.

7.2 Training

In some examples, to train the predistorter $G_I$ 4015 and the simulator $\hat{H}_I$ 4016, training data is collected from the printing of previous objects and the collected training data is used to determine predistorter parameters $\Theta_G$ for the predistorter $G_I$ 4015 and the simulation parameters $\Theta_{\hat{H}}$ for the simulator $\hat{H}_I$ 4016.

For example, training data including sequences of triples ($y_n$, $Z_n$, $Z_{n-1}$) of modified object specifications $y_n$, current scans $Z_n$, and previous scans $Z_{n-1}$ are stored during previous printing passes. That training data and possibly other data is then processed in a batch or online training procedure to determine predistorter parameters $\Theta_G$ for the predistorter $G_I$ 4015 and the simulation parameters $\Theta_{\hat{H}}$ or the simulator $\hat{H}_I$ 4016, for example, using an "unrolling" procedure to train recurrent neural network components.

Figure 42:
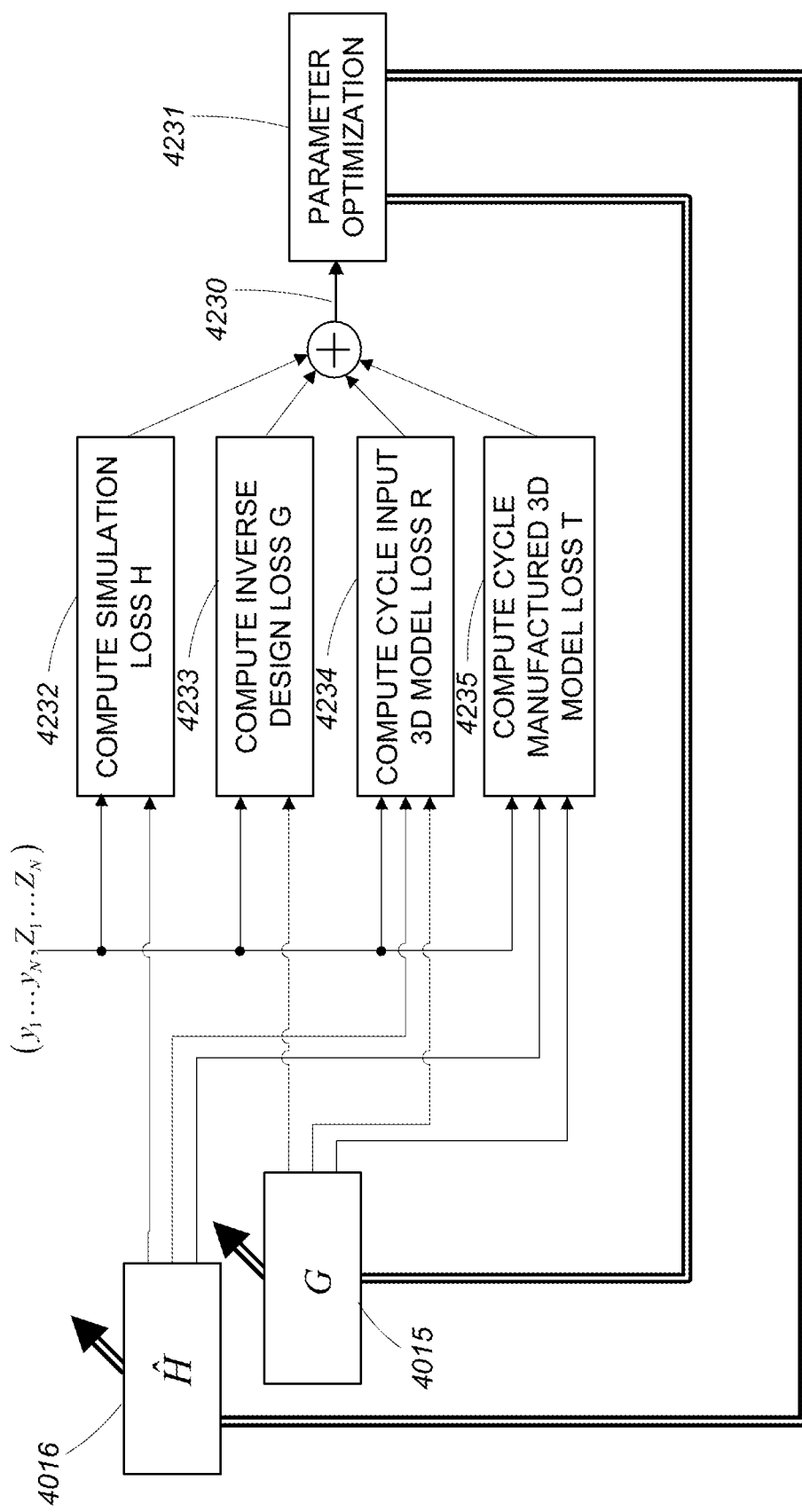
FIG. 42 is a training system for training the eighth configuration.

Referring to FIG. 42, in one example of such a training procedure, a combined loss 4230 is determined as a sum (or weighted sum) of a simulation loss, an inverse design loss, a cycle input 3D model loss, and a cycle manufactured 3D model loss. That combined loss is provided to parameter optimization module 4231 that determines the updated predistorter parameters $\Theta_G$ and the updated simulation parameters $\Theta_{\hat{H}}$.

In some examples, the parameter optimization module 4231 determines the parameters $\Theta_G$ and $\Theta_{\hat{H}}$ by using an optimization algorithm to iteratively update the parameters $\Theta_G$ and $\Theta_{\hat{H}}$ until some stopping criteria (e.g., number of iterations, convergence). One common way of updating model parameters involves computing/estimating gradients of the combined loss function with respect to the model parameters. For example, backpropagation algorithm for an artificial uses these gradient estimates. Of course, other parameter update schemes can be used.

7.2.1 Simulation Loss Computation

Referring to FIG. 43, to compute the simulation loss, a compute simulation loss module 4232 (see FIG. 42) receives training data including pairs ($y_n$, $Z_n$) of modified object specifications $y_n$ and previous scans $Z_{n-1}$. The modified object specification $y_n$ is provided to a processing program 4019 which processes the modified object specification to generate a fabrication plan $u_n$ 4021.

The fabrication plan $u_n$ 4021 and the previous scan $Z_{n-1}$ 155 are provided to the simulator $\hat{H}_I$ 4016 as input and the simulator $\hat{H}_I$ 4016 generates a corresponding predicted fabricated part $\hat{Z}_n$ 177. The fabrication plan $u_n$ 4021 is also provided to the printer 125 which prints a fabricated part $\tilde{Z}_n$ 175 according to the fabrication plan $u_n$ 4021.

The fabricated part is scanned, resulting in scan $Z_n$ 155. For each training pair, the simulation loss 4336 is computed as a difference between the scan $Z_n$ 155 and the predicted fabricated part $\hat{Z}_n$ 177.

7.2.2 Inverse Design Loss Computation

Referring to FIG. 44, to compute the inverse design loss, a compute inverse design loss module 4233 (see FIG. 42) receives training data including pairs ($y_n$, $Z_n$) of modified object specifications $y_n$ and previous scans $Z_{n-1}$.

The modified object specification $y_n$ is provided to a processing program 4019 which processes the modified object specification to generate a fabrication plan $u_n$ 4021. The fabrication plan $u_n$ 4021 is provided to the printer 125 which prints a fabricated part $\tilde{Z}_n$ 175 according to the fabrication plan $u_n$ 4021. The fabricated part is scanned, resulting in scan $Z_n$ 155.

The scan $Z_n$ 155 and a scan from the previous print run $Z_{n-1}$ 155 are provided to the predistorter $G_I$ 4015 as input, and the predistorter $G_I$ 4015 generates a corresponding predicted fabrication plan $u_n$ 4020. For each training pair, the inverse design loss 4437 is computed as a difference between the fabrication plan $u_n$ 4021 and the predicted fabrication plan $u'_n$ 4020.

7.2.3 Cycle Input 3D Model Loss Computation

Figure 45:
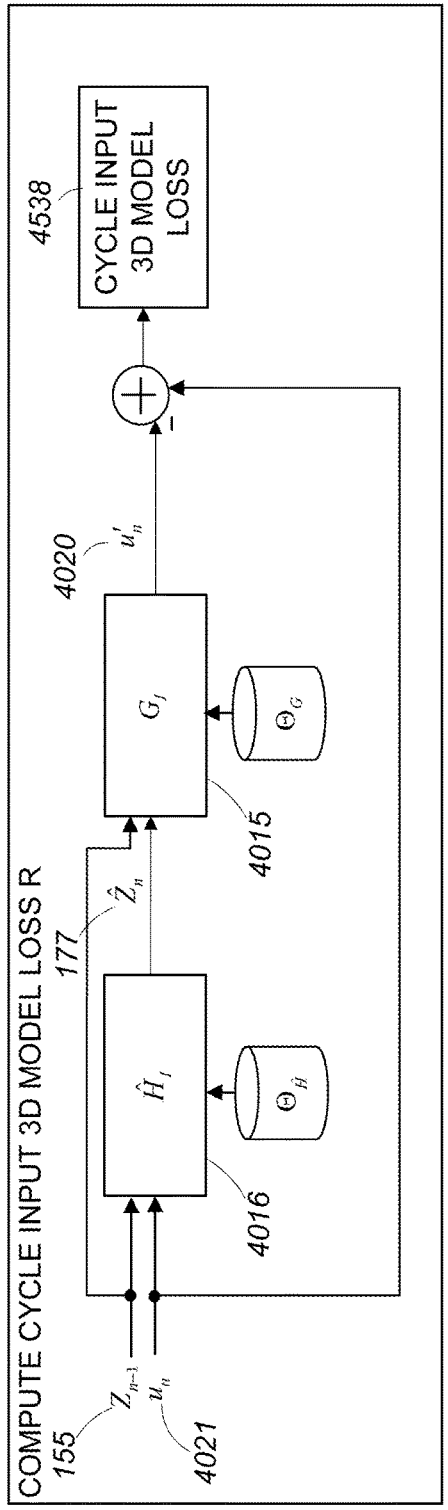
FIG. 45 is a cycle input 3D model loss computation module

Referring to FIG. 45, to compute the cycle input 3D model loss, a compute cycle input 3D model loss module 4234 (see FIG. 42) receives training data including pairs ($u_n$, $Z_{n-1}$) of fabrication plans $u_n$ and previous scans $Z_{n-1}$. For each training pair, the fabrication plan $u_n$ and the previous scan $Z_{n-1}$ are provided as input to the simulator $\hat{H}_I$ 4016, which uses them to generate a corresponding predicted fabricated part $\hat{Z}_n$ 177. The predicted fabricated part 177 and the previous scan $Z_{n-1}$ are provided to the predistorter $G_I$ 4015 which uses them to generate a predicted fabrication plan $u'_n$ 4020. The cycle input 3D model loss 4538 is computed as a difference between the fabrication plan $u_n$ 4021 and the predicted fabrication plan $u'_n$ 4020.

7.2.4 Cycle Manufactured 3D Model Loss Computation

Figure 46:
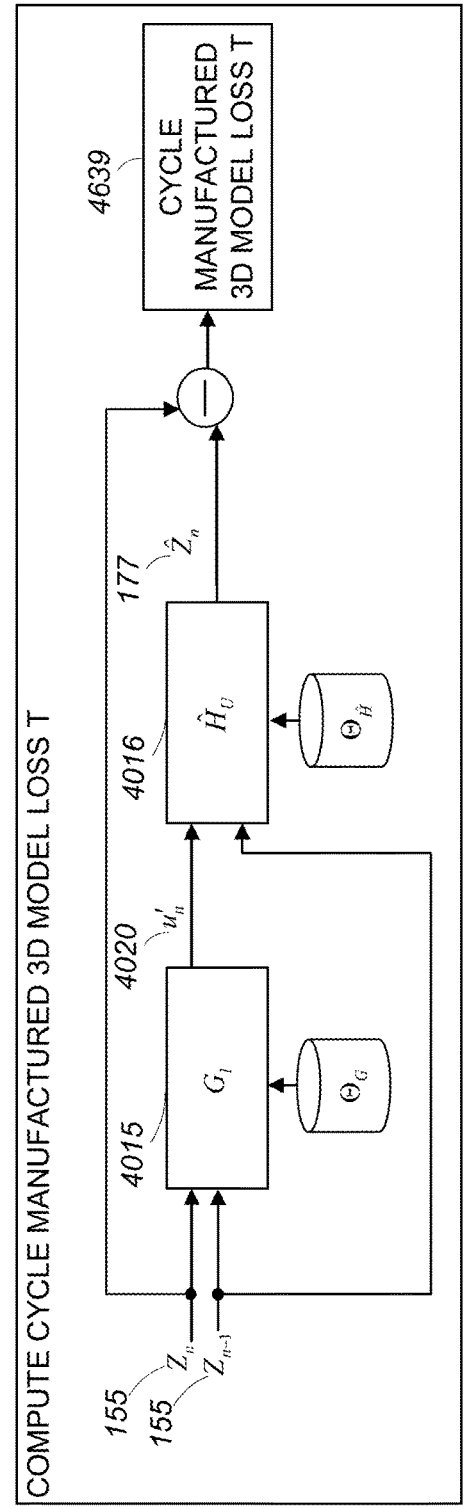
FIG. 46 is a cycle manufactured 3D model loss computation module.

Referring to FIG. 46, to compute the cycle manufactured 3D model loss, a compute cycle manufactured 3D model loss module 4235 (see FIG. 42) receives training data including pairs ($Z_n$, $Z_{n-1}$) of the current scan $Z_n$ and the previous scan $Z_{n-1}$ as input. For each training data pair, the current scan $Z_n$ and the previous scan $Z_{n-1}$ are provided to the predistorter $G_I$ 4015 which uses them to generate a predicted fabrication plan u'$_n$ 4020. The predicted fabrication plan un 4020 and the previous scan $Z_{n-1}$ are provided to the simulator $\hat{H}_I$ 4016, which uses them to generate a corresponding predicted fabricated part $\hat{Z}_n$ 177. The cycle manufactured 3D model loss 4639 is computed as a difference between the current scan $Z_n$ 155 and the predicted fabricated part $\hat{Z}_n$ 177.

8 ALTERNATIVES

In some examples, the specifications of objects (or parts of objects) can be represented as any one of a mesh: e.g., a list of vertices and triangles; a triangle soup, a boundary representation (brep), a solid model: a voxel grid (uniform and adaptive), a tetrahedral model, a solid model with material assignment, a procedural model, and implicit model.

Aspects described herein are applicable to any number of additive manufacturing processes, including but not limited to inkjet-based AM, powder-bed, Fused deposition modeling (FDM), Stereolithography (SLA), SLS, DMLS, and Electron-beam melting.

In some examples, the processing program described above receives an input that is a 3D model. The output is a fabrication plan that includes instructions to the manufacturing hardware on how/where to move, how to deposit material; how to process material (e.g., curing unit on, off, power; laser power, etc.); auxiliary devices (e.g., rollers, cleaning stations, thermal management). The processing program tasks might include: determine part orientation, generate support material, compute digital layers (e.g., slices), compute infill pattern, compute contour, generate machine instructions. Furthermore, sensing data can be used as input to the processing program.

The processing program may also utilize machine state or 3D scan data or both as input.

The processing program can be specified as follows. The input includes a 3D model. The output includes a fabrication plan that includes instructions to the manufacturing hardware on how/where to move, how to deposit material; how to process material (e.g., curing unit on, off, power; laser power, etc.); auxiliary devices (e.g., rollers, cleaning stations, thermal management). Tasks performed in the processing program include determining part orientation, generating support material, computing digital layers (e.g., slices), computing infill pattern, computing contour, and generating machine instructions.

Sensing data (e.g., a 3D scan and material IDs for each voxel) can be used as additional input to the processing program. For example, the processing program might use sensor data to adapt the fabrication plan. Machine state can be used to adjust: the amount of material that is deposited from each deposition device; the motion offset for deposition devices, e.g., adjusting the offset in printhead (typically y-axis) to obtain flat print, high quality print, faster print.

In some examples, the fabrication plans described above refer to the sequence of operations required to be executed by the hardware in order to manufacture an object or a set of objects. It should include how the movements of the positioning system, the deposition timing and amount of deposition from the deposition device(s) (e.g., extruders, dispensers, nozzles). Other information might include: curing/sintering sequence and settings (e.g., UV light, IR, heat); movement and settings of supporting devices (e.g., rollers, scrapers), temperature/pressure settings, etc. The fabrication plan does not need to be a single sequence. Many different actions can be executed in parallel. They can be synchronized or unsynchronized. The plan might be for the complete object or it can be a partial fabrication plan (e.g., for part of the object). The plan can also include capturing the data from sensors. The plan might be modified based on this data. See FIG. 4 for an example fabrication plan.

In some examples, the machine state described above, maintains information about the current state of the hardware, materials, and overall function of the machine as a whole. The machine state may include in general, performance models for all printer elements (e.g., motion system, deposition devices, curing devices, auxiliary devices, etc.), a model (e.g., average, distribution) of the jetting volume for each deposition device, e.g. nozzle, variation of jetting volume for deposition devices with respect to the position in the build volume, an alignment of deposition devices, a location model of deposited materials (e.g., offsets with respect to where the material was ejected and where it is deposited), curing/sintering intensity model (e.g., how much light output by current UV device), and auxiliary devices (e.g., roller, scrapers, flattening devices), In some examples, machine state is updated based on measurement data taken by the sensors in the printer. The 3D scanner is one potential sensor like this. Machine state estimation process is used to estimate and update machine state.

Many different types of 3D scanning systems may be used, including but not limited to triangulation (e.g., laser-based triangulation), depth from X: e.g., focus, defocus, stereo, depth from lightfield data, time of flight measurements, interferometry-based methods, MicroCT, and Terahertz imaging.

Furthermore, any of the above-mentioned imaging modalities may also be coupled with 2D imaging methods, (e.g., CMOS cameras).

The imaging modalities above can provide the following data: depth map (or 2.5D representation): a depth value for each x,y location; typically data and an interpolation function, surface data: e.g., a mesh that represents the surface (or part of the surface), depth map 30 color (e.g., material labels)—allows to discriminate between support and build material (or different build materials), surface data+color (e.g., material labels), volumetric data (e.g., data on a voxel grid) that represents volumetric information—e.g., terahertz imaging, microCT, OCT, volumetric data+material labels: each point in the material volume has its properties (e.g. spectral reflectivity, index of refraction, absorption coefficients), and raw, unprocessed data (or minimally processed data) from sensor device.

In some examples, the input to the machine learning models described above can be a 3D model (representation as described before) or part of the model. Typically, only a subsection of the model is used to simplify training process. For example, the data can be a set of voxel layers, where each layer can be represented as an image data.

In other examples, the input is a 3D scan of the printed part (or part printed so far). This can be represented, for example, as a heighfield data (2.5), or labelled heightfield (2.5+material labels), or volumetric data, or volumetric data with material labels In yet other examples, the input is a machine state that describes the performance models of different printer components (e.g., printheads, positioning system, curing system, auxiliary components). Combinations of the above inputs can also be used.

The output of the machine learning models described above can be a 3D model (representation as described before) or part of the model. Typically, only a subsection of the model is used to simplify training process. For example, the data can be a set of voxel layers, where each layer can be represented as an image data. Alternatively, the output can be a fabrication plan.

In some examples, one or both of the simulator $\hat{H}$ and predistorter $G$ are structures as a sequence of operations ("building blocks"). For example, the simulator may be represented as a composition $\hat{H}=\hat{H}^{(K)} \circ \hat{H}^{(K-1)} \circ \ldots \circ \hat{H}^{(1)}$ such that a transformation from an printer input $y_n$ goes through a transformation $\hat{H}^{(1)}$ first, then the result of this transformation goes through $\hat{H}^{(2)}$ next, and so forth to yield the expected printer output (or its scan) $\hat{z}_n$. Similarly, the predistorter may be similarly structured as $G=G^{(1)} \circ G^{(2)} \circ \ldots \circ G^{(K)}$, for example, with essentially the $i^{th}$ term may approximate a pre-inverse of one of the components, $G^{(i)} \approx \hat{H}^{(i)^{-1}}$ But bit it should be recognized that in some approaches, only $\hat{H}$ has such a decomposed form, or only $G$ has such a decomposed form.

In some examples that make use of a decomposed form, the predistorter and/or the simulator include building blocks that are specific to additive manufacturing processes. In some examples, the building blocks may have general forms, such as convolution neural network. However alternatively, instead of using existing convolutional neural network structures typically used for images or volumes, the one or more of the building blocks approximates one or more aspects of the print process or reverses the effects of the process. In some examples, the parameters are continuous, while in other examples, the parameters are discrete.

In some examples, each (or at least some) simulation component $\hat{H}^{(k)}$ takes a material volume(s) and returns a material volume(s), which may be expressed as $y^{(k+1)}=\hat{H}^{(k)}(y^{(k)})$. In examples where the $y_n$ represent three-dimensional volumes (e.g., a three-dimensional array of voxels) each voxel is assigned material composition, e.g., fraction of each material from a specific material set. For example, at a given point, there might be 40% of material A, and 60% of material B. Void (no material) can be treated as a separate material or it can be computed as a difference from 100%. Different materials can be encoded using separate channels. The following list of operations can be employed to describe a process represented by one of the $\hat{H}^{(k)}$: blur, sharpen, scaling of material fraction, other volume/image processing filter, translate, rotate, scale of the volume/image data, other affine transformation operations, morphological operations (e.g., erode, dilate of volume/image), image/volume-guided operations, and other operations that process volumes/image data and can be described by low-parameter analytical formulas, which may be resolution independent.

Each of the operations can have parameters. For example, a Gaussian blur can be parameterized by standard deviation that controls the amount of blur. A translation operation can be parameterized by a translation vector (dx, dy, dz). The process of computing functions $G$ and $\hat{H}$ involves 1) determining the sequence of specific operations for a set of predetermined parameterized transformations, and 2) computing parameter values for each operation. The process of computing, or learning, these functions effectively involves an optimization procedure similar to neural-network training algorithms. For example, the best operation sequence can be determined by a discrete search strategy. For each specific sequence of operations, parameter values for each operations can be computed using, for example, continuous optimization such as gradient descent, Newton's method, etc. The objective function defined for these optimizations is effectively the loss function.

A variety of training approaches can be used. For example, having selected the sequence of parameterized transformations $\hat{H}^{(1)}, \ldots, \hat{H}^{(K)}$, the combined loss function approximation approaches may be used in which the parameters of the components of $\hat{H}$ are estimated at the same time as the parameters of $G$. In some alternatives, the characteristics of $\hat{H}$ (i.e., the parameters or the sequence and the parameters) are determined first and fixed while the parameters of $G$ are determined. In an online adaptation, such an alternation can continue.

In some cases, the sequence of operators can be defined by a human expert instead of the search process. The parameter values can still be computed by the optimization process.

In some examples, the predistorter and the simulator are configured to work for multi-material objects. The parameters for the predistorter and the simulator may be different for different materials (e.g., build materials vs. support materials). The parameters for the predistorter and the simulator may be different for different material interfaces as well. In some examples, the predistorter and the simulator also depend on the spatial multi-material configuration of what has been built (partially) and what comes next.

9 IMPLEMENTATIONS

The approaches described above may be incorporated into and/or used in conjunction with the approaches described in U.S. Pat. No. 10,252,466, titled "SYSTEMS AND METHODS OF MACHINE VISION ASSISTED ADDITIVE FABRICATION"; and U.S. Pat. No. 10,456,984, titled "ADAPTIVE MATERIAL DEPOSITION FOR ADDITIVE MANUFACTURING." These patents are incorporated herein by reference.

An additive manufacturing system typically has the following components: a controller assembly is typically a computer with processor, memory, storage, network, IO, and display.

It runs a processing program. The processing program can also read and write data. The controller assembly effectively controls the manufacturing hardware. It also has access to sensors (e.g., 3D scanners, cameras, IMUs, accelerometers, etc.).

More generally, the approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

It is to be understood that the foregoing description is intended to illustrate and not to limit the scope of the invention, which is defined by the scope of the appended claims. Reference numerals in the claims are provided for clarity only (e.g., to provide a connection between claims and one or more embodiments) and should not be seen as limiting the extent of the matter protected by the claims. Other embodiments are within the scope of the following claims.

What is claimed is:

1. A method for fabricating a 3D object via a printer, the method comprising:
   receiving a first 3D specification of a first part of the 3D object;
   processing the first 3D specification of the first part of the 3D object to form first control data for controlling the printer to fabricate the first part according to a first transformation configured according to characteristics of a first printing process,
   causing the printer to print the first part of the object according to a second printing process based at least in part on the first control data;
   receiving first scan data representative of the first part of the object printed according to the second printing process; and
   forming second control data for fabricating one or more further parts of the 3D object according to a second transformation configured according to characteristics of the second printing process.

2. The method of claim 1 wherein forming the first control data includes using a first simulation model of the first printing process.

3. The method of claim 2 wherein the first transformation is determined based at least in part on the first simulation model.

4. The method of claim 3 wherein the first transformation is configured according to first configuration data determined in a training process performed using the first simulation model.

5. The method of claim 2 wherein the first simulation model of the first printing process simulates one or more of material flow, material shrinkage, droplet flattening, droplet coalescing, and material surface tension associated with the second printing process.

6. The method of claim 1 wherein forming the second control data includes using a second simulation model of the second printing process.

7. The method of claim 6 wherein the second transformation is determined based at least in part on the second simulation model.

8. The method of claim 7 wherein the second transformation is configured according to second configuration data determined in a training process performed using the second simulation model.

9. The method of claim 6 further comprising forming the second simulation model using the first scan data and the first simulation model.

10. The method of claim 6 wherein the second simulation model of the second printing process simulates one or more of material flow, material shrinkage, droplet flattening, droplet coalescing, and material surface tension associated with the second printing process.

11. The method of claim 1 wherein the 3D specification represents an additional part of the 3D object to be fabricated on a previously fabricated part of the 3D object.

12. The method of claim 11 wherein the first transformation predistorts the additional part of the 3D object for fabrication on the previously fabricated part of the 3D object.

13. The method of claim 12 wherein the predistorted additional part of the 3D object mates with the previously fabricated part of the 3D object.

14. The method of claim 11 wherein the previously fabricated part comprises a surface on which the additional part is to be fabricated, and the scan data represents said surface.

15. The method of claim 1 wherein the scan data comprises a depth map of the first part of the object printed according to the second printing process.

16. The method of claim 1 wherein using the first transformation comprises applying an artificial neural network configured using first configuration data and using the second transformation comprises applying an artificial neural network configured using second configuration data.

17. The method of claim 1 wherein at least one of a material flow characteristic, a material shrinkage characteristic, a droplet flattening characteristic, a droplet coalescing characteristic, material surface tension characteristic, and a jetting characteristic differs between the first printing process and the second printing process.

18. A system for fabricating a 3D object via a printer, the system comprising:
   an input for receiving a first 3D specification of a first part of the 3D object;
   one or more processors configured to:
   process the first 3D specification of the first part of the 3D object to form first control data for controlling the printer to fabricate the first part according to a first transformation configured according to characteristics of a first printing process, cause the printer to print the first part of the object according to a second printing process based at least in part on the first control data;
receive first scan data representative of the first part of the object printed according to the second printing process; and
form second control data for fabricating one or more further parts of the 3D object according to a second transformation configured according to characteristics of the second printing process.

\* \* \* \* \*